US012676301B2

(12) United States Patent
Kim et al.

(10) Patent No.: US 12,676,301 B2
(45) Date of Patent: Jul. 7, 2026

(54) METAL PHOSPHATE COATINGS FOR LI-ION BATTERIES

(71) Applicant: Rivian IP Holdings, LLC, Irvine, CA (US)

(72) Inventors: Soo Kim, Fremont, CA (US); Johnson Mark, San Jose, CA (US); Victor Prajapati, San Francisco, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 1029 days.

(21) Appl. No.: 17/566,440

(22) Filed: Dec. 30, 2021

(65) Prior Publication Data

US 2023/0216029 A1 Jul. 6, 2023

(51) Int. Cl.

| | |
|---|---|
| ***H01M 4/36*** | (2006.01) |
| ***H01M 4/02*** | (2006.01) |
| ***H01M 4/04*** | (2006.01) |
| ***H01M 4/505*** | (2010.01) |
| ***H01M 4/525*** | (2010.01) |
| ***H01M 4/62*** | (2006.01) |
| ***H01M 10/0525*** | (2010.01) |

(52) U.S. Cl.

CPC ............ *H01M 4/366* (2013.01); *H01M 4/04* (2013.01); *H01M 4/505* (2013.01); *H01M 4/525* (2013.01); *H01M 4/628* (2013.01); *H01M 10/0525* (2013.01); *H01M 2004/021* (2013.01); *H01M 2004/028* (2013.01)

(58) Field of Classification Search

CPC ........ H01M 4/366; H01M 4/04; H01M 4/505; H01M 4/525; H01M 4/628; H01M 10/0525; H01M 2004/021; H01M 2004/028

See application file for complete search history.

(56) References Cited

U.S. PATENT DOCUMENTS

| | | | | |
|---|---|---|---|---|
| 10,374,262 | B2 | 8/2019 | Aykol et al. | |
| 2018/0277830 | A1* | 9/2018 | Xing | H01M 4/366 |
| 2020/0194760 | A1* | 6/2020 | Kim | H01M 50/451 |
| 2020/0295361 | A1* | 9/2020 | Takami | H01M 4/366 |
| 2020/0403216 | A1* | 12/2020 | Nanda | H01M 4/623 |
| 2021/0280863 | A1* | 9/2021 | Liu | H01M 10/0525 |
| 2021/0336257 | A1* | 10/2021 | Tokuda | H01M 4/502 |
| 2023/0170477 | A1* | 6/2023 | Kim | H01M 10/052<br>429/231.95 |

FOREIGN PATENT DOCUMENTS

WO WO 2020/059450 A1 * 3/2020 ........ H01M 10/4235

OTHER PUBLICATIONS

Atsuo Yamada et al, Reaction Mechanism of the Olivine-Type Lix ( Mn0.6Fe0.4 ) PO 4 ( 0×1 )—2001 J. Electrochem. Soc. 148 A747 (Year: 2001).*

(Continued)

*Primary Examiner* — Allison Bourke

(74) *Attorney, Agent, or Firm* — HG LAW LLP

(57) ABSTRACT

Lithium-ion batteries (LIBs) which include a metal phosphate coating material reactive (scavenging) or stable with cathode materials, HF, LiF, $PF_5^-$, and LiOH. The metal phosphates may be applied on the cathode material of LIBs.

16 Claims, 10 Drawing Sheets

(56) References Cited

OTHER PUBLICATIONS

Hu et al, Structure and performance of the LiFePO4 cathode material: from the bulk to the surface. Nanoscale, 2020, 12, 15036 (Year: 2020).*
Wang, Zhao-Hui et al, "LiFe0.8Mn0.2PO4/C Cathode material with high energy density for lithium-ion batteries", Journal of Alloys and Compounds 532 (2012) 25-30. (Year: 2012).*
Cho, J. et al., "Novel LiCoO2 Cathode Material with Al2O3 Coating for a Li Ion Cell", Chem. Mater., 12(12):3788-3791 (2000).
Cho. J. et al., "Control of AlPO4-nanoparticle coating on LiCoO2 by using water or ethanol"; Electrochimica Acta, 50(20):4182-4187 (2005).
Cho. J. et al., "Improvement of Structural Stability of LiCoO2 Cathode during Electrochemical Cycling by Sol-Gel Coating of SnO2"; Electrochemical and Solid-State Letters, 3(8):362-365 (2000).
Chung. K. et al., "Onset Mechanism of Jahn-Teller Distortion in 4 V LiMn2O4 and Its Suppression by LiM0.05Mn1.95O4 (M ?=? Co , Ni) Coating"; Journal of The Electrochemical Society, 152(4):A791-A795 (2005).
Deng, S., et al., "New insight into atomic-scale engineering of electrode surface for long-life and safe high voltage lithium ion cathodes," Nano Energy 38; 19-27 (Aug. 2017).
Kim. S. et al., "Effects of transition metal doping and surface treatment to improve the electrochemical performance of Li2MnO3"; Journal of Electroceramics, 30:159-165 (2013).
Li, W., et al., "Ultra-Thin AlPO4 Layer Coated LiNi0.7Co0. 15Mn0. 15O2 Cathodes With Enhanced High-Voltage and High-Temperature Performance for Lithium-Ion Half/Full Batteries," Front. Chem. 8(597):1-9(Jul. 2020).
Liu. W. et al., "Gassing in Sn-Anode Sodium-Ion Batteries and Its Remedy by Metallurgically Prealloying Na"; ACS Appl. Mater. Interfaces, 11(26): 23207-23212 (2019).
Lou. S. et al., "Superior performance of ordered macroporous TiNb2O7 anodes for lithium ion batteries: Understanding from the structural and pseudocapacitive insights on achieving high rate capability"; Nano Energy, 34:15-25 (2017).
Lu, J. et al., "Effectively suppressing dissolution of manganese from spinel lithium manganate via a nanoscale surface-doping approach"; Nature Communications, 5(5693):1-8 (2014).
Myung. S. et al., "Role of Alumina Coating on Li—Ni—Co—Mn—O Particles as Positive Electrode Material for Lithium-Ion Batteries"; Chem. Mater., 17(14): 3695-3704 (2005).
Noh. J. et al., "Mechanochemical Synthesis of Li2MnO3 Shell/LiMO2 (M=Ni, Co, Mn) Core-Structured Nanocomposites for Lithium-Ion Batteries"; Scientific Reports, 4:4847 (2014).
Park. J. et al., "Ultrathin Lithium-Ion Conducting Coatings for Increased Interfacial Stability in High Voltage Lithium-Ion Batteries"; Chem. Mater., 26(10):3128-3134 (2014).
Sun, Y. K. et al., Nanostructured high-energy cathode materials for advanced lithium batteries. Nat Mater., Nov.;(11):942-7 (2012).
Sun. Y. et al., "High-energy cathode material for long-life and safe lithium batteries"; Nature Materials, 8:320-324 (2009).
Tan. G. et al., "Freestanding three-dimensional core-shell nanoarrays for lithium-ion battery anodes"; Nature Communications, 7:11774:1-10 (2016).

* cited by examiner

LiFePO$_4$-AlPO$_4$ Reactions

Fraction of LiFePO$_4$ [ x in x·Li$_{0.14285714}$Fe$_{0.14285714}$P$_{0.14285714}$O$_{0.57142857}$ + (1 - x) . Al$_{0.16666667}$P$_{0.1666}$ Molar Fraction of LiFePO$_4$ [x in x·LiFePO$_4$ + (1 - x)·AlPO$_4$]

LiFePO$_4$-CrPO$_4$ Reactions

Fraction of LiFePO$_4$ [ x in x·Li$_{0.14285714}$Fe$_{0.14285714}$P$_{0.14285714}$O$_{0.57142857}$ + (1 - x) . Cr$_{0.16666667}$P$_{0.1666}$ Molar Fraction of LiFePO$_4$ [x in x·LiFePO$_4$ + (1 - x)·CrPO$_4$]

900

Top 4 Metal Phosphates
| Electrolyte Stability | HF Scavenger | LiF Stability | $PF_5$- Scavenger | LiOH Stability |
|---|---|---|---|---|
| $Sn_5(PO_5)_2$ | 7.1x | Stable w/ LiF | 18.8x | 4.7x |
| $Sn_3(PO_4)_2$ | 5.8x | Stable w/ LiF | 6.4x | 3.0x |
| $Hf_2P_2O_9$ | 7.0x | Stable w/ LiF | 7.6x | 3.1x |
| $Bi_3PO_7$ | 6.4x | Stable w/ LiF | 17.6x | 8.4x |
FIG. 11
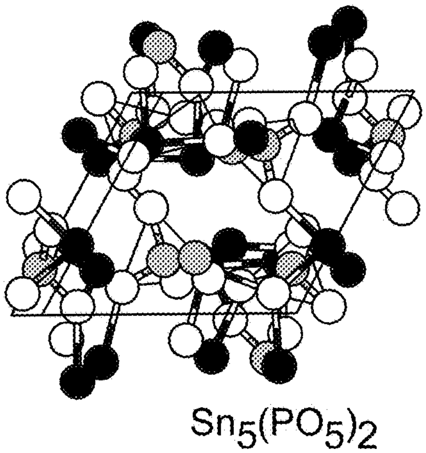
$Sn_5(PO_5)_2$
FIG. 12A
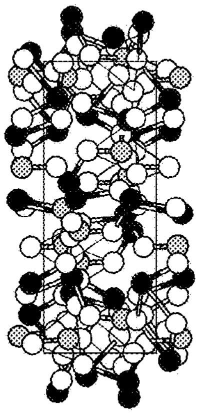
$Sn_3(PO_4)_2$
FIG. 12B
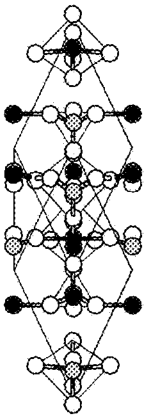
$Hf_2P_2O_9$
FIG. 12C
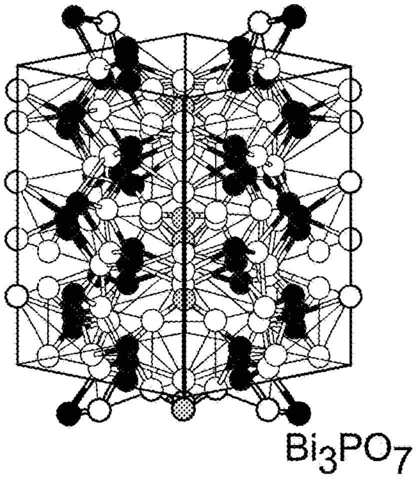
$Bi_3PO_7$
FIG. 12D

METAL PHOSPHATE COATINGS FOR LI-ION BATTERIES

INTRODUCTION

Electric vehicles require a source of electricity in order to operate. Typically, electric vehicles use large battery packs which consist of a plurality of batteries. These batteries may be formed by a number of individual cells or may themselves be individual cells depending on the configuration of the battery and battery pack. Each battery is comprised of a cathode, anode, an electrolyte and a separator. Most common batteries used in electric vehicles are Li-ion batteries ("LIBs").

SUMMARY OF THE DISCLOSURE

Cathode degradation is one of the most important factors that limits the lifetime of a LIB. Cathode degradation may occur during the structural phase transition where lithium (Li) ions (de-)insert from the electrode material and come in contact with another subcomponent in the LIB, such as liquid electrolyte, separator, and metal current collector (typically, Al metal). One common approach to suppressing cathode degradation is to apply a protective coating on the cathode particles. Three major roles of coatings are: 1) formation of modified solid electrolyte interface (SEI), which helps stabilize the interface between electrode and electrolyte, in particular, in the event of electrolyte decomposition; 2) improvement of electrolyte wetting to ensure uniform $Li^+$ ion (de-)insertion; and 3) suppression of surface phase transition of the cathode material (i.e., surface decomposition) as a physical barrier.

Typically, oxide-type coatings can withstand the harsh, operating conditions of the LIBs. For example, oxide coatings, such as $Al_2O_3$, MgO, and $MnO_x$ are used for coating commercially available cathode materials. Common cathode materials have a general formula of Li-M-O, such as $LiCoO_2$, $Li(Ni_aCo_bMn_c)O_2$ (where, a+b+c=1), $Li(Mn_aNi_b)_2O_4$ (where a+b=1). However, some cathode materials, for example, $LiFePO_4$ (LFP) cathode material needs to be synthesized in a reducing environment. Therefore, LFP cathodes may not be able to accommodate common oxide materials as coating materials, because it is likely that the metal precursors intended for the formation of oxide coating will react with $PO_4$ precursors to form other stable species (e.g., $MPO_4$, etc.).

A common phosphate coating for the cathodes of LIBs is $AlPO_4$. For example, $AlPO_4$ has been used as a coating material for $LiCoO_2$, $Li(Ni_aCo_bMn_c)O_2$ and $LiNi_{0.5}Mn_{1.5}O_4$ cathodes and has shown to lead to limited volume changes upon cell cycling. (See *Electrochim. Acta* 50 (2005) 4182), *Front. Chem.* 8 (2020) 597, *Nano Energy* 38 (2017) 19.) $AlPO_4$ is a stable coating material when coated onto cathodes comprised of Li-based materials. For example, FIG. 1 shows that a chemical reaction between $LiFePO_4$ and $AlPO_4$ does not occur. The x-axis shows the molar fraction of $LiFePO_4$, where x=0 is 100%, $AlPO_4$ and x=1 is 100% $LiFePO_4$. The y-axis describes the reaction enthalpy in eV/atom. The straight line between the molar fraction x=0 to x=1 demonstrates a zero-reaction energy per atom (i.e., y=0 eV/atom). The zero-reaction energy means that if $AlPO_4$ is used as a coating material on a $LiFePO_4$ cathode, they do not react to each other (i.e., $AlPO_4$ is a stable coating for the $LiFePO_4$ cathode, and does not decompose to another chemical species). In contrast, $CrPO_4$ is considered an unstable coating material as it will react with the $LiFePO_4$ cathode material as shown in FIG. 2. The x-axis shows the molar fraction of $LiFePO_4$, where x=0 is 100% $CrPO_4$ and x=1 is 100% $LiFePO_4$. The y-axis describes the reaction enthalpy in eV/atom. Unlike $AlPO_4$, $CrPO_4$ will react with $LiFePO_4$ cathode material, where the most energetically favorable chemical reaction (at the minimum point) is: 0.8 $LiFePO_4$+0.2 $CrPO_4$→0.2 $FeP_4O_{11}$+0.04$P_2O_5$+0.2 $Li_4CrFe_3O_8$+0.12P with reaction enthalpy ($E_{rxm}$) of −0.445 eV/atom. Thus, if $CrPO_4$ is chosen as a coating material for $LiFePO_4$ cathode, the two materials will react with each other to form $Li_4CrFe_3O_8$, which means that fewer lithium ions from the cathode component are available for battery capacity. At the same time, $CrPO_4$ itself will decompose to other stable phase mixtures that can lead to changes in coating morphology and volume changes, therefore, $CrPO_4$ is not an effective coating material for $LiFePO_4$.

Therefore, it would be beneficial to identify other metal phosphates that are capable of being used in cathode coating materials and to provide superior protection from outside agents, as compared to the $AlPO_4$ coatings.

This disclosure provides novel metal phosphate coating materials useful for coating the cathode of a LIB, wherein the coating materials have an improved ability to prevent degradation of the cathodes, as compared to the well-studied $AlPO_4$ coating.

Exemplary embodiments of the disclosure include coating materials for the cathodes of LIBs, the coating materials comprising a metal phosphate selected from the group consisting of $Ca_2P_2O_7$, $YPO_4$, $Sn_5(PO_5)_2$, $Sn_3(PO_4)_2$, $Hf_2P_2O_9$, $BiPO_4$, $Bi_3PO_7$, $Mn_2P_2O_7$, $Mn_3(PO_4)_2$, $Ni_3(PO_4)_2$, and $Sn_2P_2O_7$, or mixtures comprising any coating materials listed herein.

In some embodiments, the coating material is coating the entire surface of the cathode, wherein the coating material comprises a metal phosphate selected from the group consisting of $Ca_2P_2O_7$, $YPO_4$, $Sn_5(PO_5)_2$, $Sn_3(PO_4)_2$, $Hf_2P_2O_9$, $BiPO_4$, $Bi_3PO_7$, $Mn_2P_2O_7$, $Mn_3(PO_4)_2$, $Ni_3(PO_4)_2$, and $Sn_2P_2O_7$ or mixtures comprising any two or more coating materials listed herein. In some embodiments, the coating material is coating a portion of the surface of the cathode, such as a portion of the surface that is less than the entirety of the surface, wherein the coating material comprises a metal phosphate selected from the group consisting of $Ca_2P_2O_7$, $YPO_4$, $Sn_5(PO_5)_2$, $Sn_3(PO_4)_2$, $Hf_2P_2O_9$, $BiPO_4$, $Bi_3PO_7$, $Mn_2P_2O_7$, $Mn_3(PO_4)_2$, $Ni_3(PO_4)_2$, and $Sn_2P_2O_7$ or mixtures comprising any two or more coating materials listed herein.

In some embodiments, the coating material comprises $Ca_2P_2O_7$. In some embodiments, the coating material comprises $YPO_4$. In some embodiments, the coating material comprises $Sn_5(PO_5)_2$. In some embodiments, the coating material comprises $Sn_3(PO_4)_2$. In some embodiments, the coating material comprises $Hf_2P_2O_9$. In some embodiments, the coating material comprises $BiPO_4$. In some embodiments, the coating material comprises $Bi_3PO_7$. In some embodiments, the coating material comprises $Mn_2P_2O_7$. In some embodiments, the coating material comprises $Mn_3(PO_4)_2$. In some embodiments, the coating material comprises $Ni_3(PO_4)_2$. In some embodiments, the coating material comprises $Sn_2P_2O_7$.

In some embodiments, the coating material may be comprised of a mixture of $AlPO_4$ and any metal phosphate material selected from the group consisting of $Ca_2P_2O_7$, $YPO_4$, $Sn_5(PO_5)_2$, $Sn_3(PO_4)_2$, $Hf_2P_2O_9$, $BiPO_4$, $Bi_3PO_7$, $Mn_2P_2O_7$, $Mn_3(PO_4)_2$, $Ni_3(PO_4)_2$, and $Sn_2P_2O_7$.

In some embodiments, the coating material of this disclosure has a thickness of 0.1 to 15 nm when coated on a LIB cathode. In some embodiments, the metal phosphate coating material layer has a thickness of 2 to 5 nm.

In some embodiments, the coated or partially coated cathode is contained in a LIB which further comprises an anode, an electrolyte, and a separator, wherein the LIB is used in an electric vehicle or energy storage system.

In some embodiments, a lithium ion battery is provided comprising an anode, the coated cathode as described in this disclosure, an electrolyte disposed between the anode and the coated cathode, and a separator, wherein the lithium-ion battery is housed in an electric vehicle.

In some embodiments, a method for assembling a LIB is provided comprising the steps of providing a separator, providing an anode, and providing the coated cathode, wherein the separator, anode and coated cathode are arranged such that the separator is between the anode and the coated cathode.

In some embodiments, a lithium ion battery pack is provided comprising a first plurality of lithium ion battery cells, each comprising a cathode having a first type of coating, and a second plurality of lithium ion battery cells, each comprising a cathode having a second type of coating different than the first type of coating, wherein the first and second plurality of lithium ion battery cells are electrically coupled together to form the lithium ion battery pack.

In some embodiments, the first plurality of lithium ion battery cells in the battery pack comprise a cathode coated with the coating materials of this disclosure.

In some embodiments, the first plurality of lithium ion battery cells is positioned within the lithium ion battery pack at one or more hotspots.

In some embodiments, the lithium ion battery pack comprises a plurality of battery modules, wherein a first one of the battery modules comprises only lithium ion battery cells of the second plurality of lithium ion battery cells and a second one of the battery modules comprises lithium ion battery cells of the first plurality of lithium ion battery cells.

BRIEF DESCRIPTION OF THE FIGURES

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 11 shows a chart with the top four metal phosphate coating materials, in accordance with some embodiments of the present disclosure.

FIG. 12A shows the crystal structure of $Sn_5(PO_5)_2$, in accordance with some embodiments of the present disclosure.

FIG. 12B shows the crystal structure of $Sn_3(PO_4)_2$, in accordance with some embodiments of the present disclosure.

FIG. 12C represents the crystal structure of $Hf_2P_2O_9$, in accordance with some embodiments of the present disclosure.

FIG. 12D represents the crystal structure of $Bi_3PO_7$, in accordance with some embodiments of the present disclosure.

DETAILED DESCRIPTION

This disclosure provides, inter alia, novel metal phosphates coating materials and cathodes coated with coating materials comprising those metal phosphates for use in LIBs. The metal phosphate coating materials of this disclosure reduce the degradation of the electrolyte and/or cathodes induced by, e.g., hydrofluoric acid (HF), lithium fluoride (LiF), lithium hydroxide (LiOH) and phosphorous pentafluoride ($PF_5^-$), thereby improving the performance of the LIB, relative to LIBs that employ bare cathodes. The coating materials of this disclosure comprise one or more metal phosphates selected from a group consisting of $Ca_2P_2O_7$, $YPO_4$, $Sn_5(PO_5)_2$, $Sn_3(PO_4)_2$, $BiPO_4$, $Bi_3PO_7$, $Mn_2P_2O_7$, $Mn_3(PO_4)_2$, $Ni_3(PO_4)_2$, and $Sn_2P_2O_7$, and mixtures thereof. For example, a cathode may be coated with a mixture of $YPO_4$ and $BiPO_4$. In another example, a cathode may be coated with a mixture of $Mn_2P_2O_7$ and $SnP_2O_7$. In yet another example, a cathode may be coated with a mixture of $AlPO_4$ and any of the metal phosphate coating materials listed herein.

In some embodiments, the coated cathode of this disclosure is comprised of a material with a formula Li—($Fe_aNi_bMn_cCo_d$)—$P_xO_y$; wherein Li is lithium, Fe is iron, Ni is a nickel, Mn is manganese, Co is cobalt, P is phosphorous, O is oxygen; a, b, c and d are numbers from 0 to 1 and a+b+c+d=1, and wherein x is a number equal to 1 or 2, and y is a number equal 3, 4, 5, 7, or 9. In some embodiments, the coated cathode is comprised of a material where a is 1, x is 1 and y is 4, or the compound with the formula of $LiFePO_4$. In another embodiment, the coated cathode is comprised of a material where a is 0.8, c is 0.2, x is 1 and y is 4, or the compound with the formula of $LiFe_{0.8}Mn_{0.2}PO_4$.

Figure 3:
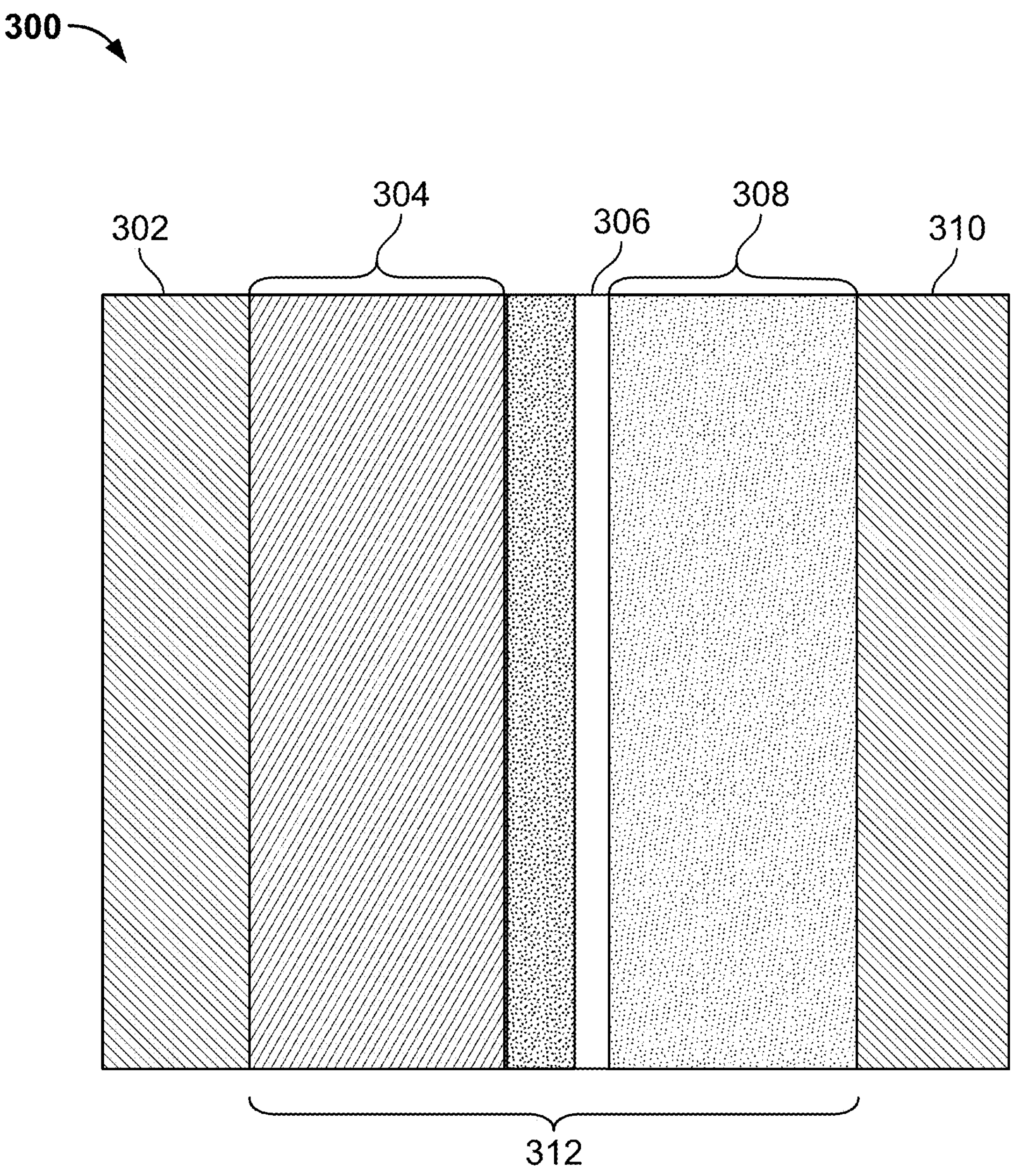
FIG. 3 shows an illustrative diagram of a LIB with a cathode coated with a metal phosphate, in accordance with some embodiments of the present disclosure.

In some embodiments, the coated cathode of this disclosure is included in a LIB which also includes an anode, an electrolyte disposed between the anode and the coated cathode, and a separator. FIG. 3 shows an illustrative diagram of a lithium-ion battery 300 with a Li-ion cathode coated with a metal phosphate in accordance with some embodiments of the present disclosure. In some embodiments, lithium-ion battery 300 may be part of a battery module or pack containing multiple LIBs in an electric vehicle. An electric vehicle may be a car (e.g., a coupe, a sedan, a truck, an SUV, a bus), a motorcycle, an aircraft (e.g., a drone), a watercraft (e.g., a boat), or any other type of vehicle. LIB 300 includes a first current collector 302, a metal phosphate coated cathode 304, separator 306, anode 308, a second current collector 310, and electrolyte 312. Cathode 304 may be coated with a coating material comprising a metal phosphate selected from the group consisting of $Ca_2P_2O_7$, $YPO_4$, $Sn_5(PO_5)_2$, $Sn_3(PO_4)_2$, $Hf_2P_2O_9$, $BiPO_4$, $Bi_3PO_7$, $Mn_2P_2O_7$, $Mn_3(PO_4)_2$, $Ni_3(PO_4)_2$, and $Sn_2P_2O_7$, or mixtures comprising any coating materials listed herein. Cathode 304 may also be coated with a coating material comprising a mixture of $AlPO_4$ and any metal phosphate material selected from the group consisting of $Ca_2P_2O_7$, $YPO_4$, $Sn_5(PO_5)_2$, $Sn_3(PO_4)_2$, $Hf_2P_2O_9$, $BiPO_4$, $Bi_3PO_7$, $Mn_2P_2O_7$, $Mn_3(PO_4)_2$, $Ni_3(PO_4)_2$, and $Sn_2P_2O_7$. The cathode 304 may be configured as the positive electrode, where electrons are received during discharge after use by a load. The separator 306 may be configured as an ion conductive barrier used to separate an anode and a cathode in a LIB, as previously described above. The anode 308 may be configured as the negative electrode, where electrons are emitted during discharge for use by a load. The current collectors 302 and 310 may be copper (Cu) or aluminum (Al) plates configured to permit current to flow to and from the anode 308 and the cathode 304. The electrolyte 312 may be an ionically conductive material configured to allow the movement of lithium ions between the anode 308 and the cathode 304.

Figure 4:
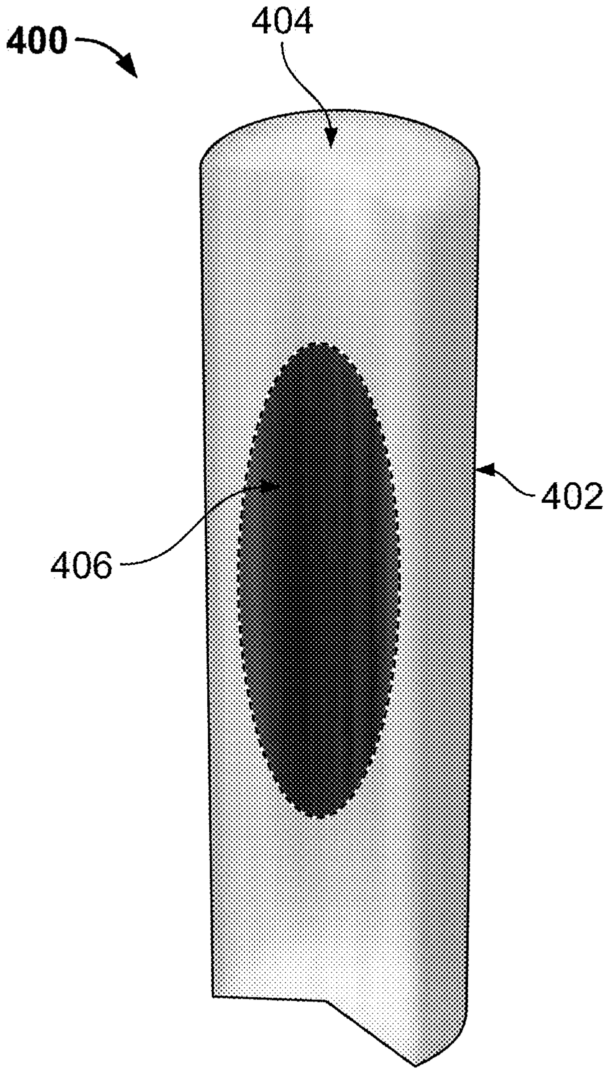
FIG. 4 shows an illustrative diagram of a hotspot inside a cylindrical LIB cell.

In some embodiments, a LIB having a hotspot or used in a hotspot may have a coated cathode to prevent degradation from accumulated stress. FIG. 4 shows an illustrative diagram a cylindrical LIB 400 having a hotspot 406. As LIB 400 charges and discharges, heat builds up within the battery, which dissipates to the surrounding environment through the outer surface 402. This generates a temperature gradient within LIB 400, which is represented in grayscale in FIG. 4. Hotter temperatures are depicted darker than cooler temperatures. The outer surface 402 of the LIB 400 is relatively cool as the heat generated can dissipate to the surrounding environment. The inner region 404 of the LIB 400 experiences heat accumulation, where hotspot 406 is located (e.g., the middle centerline portion of LIB 400). Accordingly, the cathode of LIB 400 may be coated with the metal phosphate coating of the present disclosure to prevent degradation of the cathode. In some embodiments, the portion of the cathode in hotspot 406 is selectively coated with the metal phosphate coating of the present disclosure and the surrounding portion of the cathode is not coated or coated with a different material.

Figure 5:
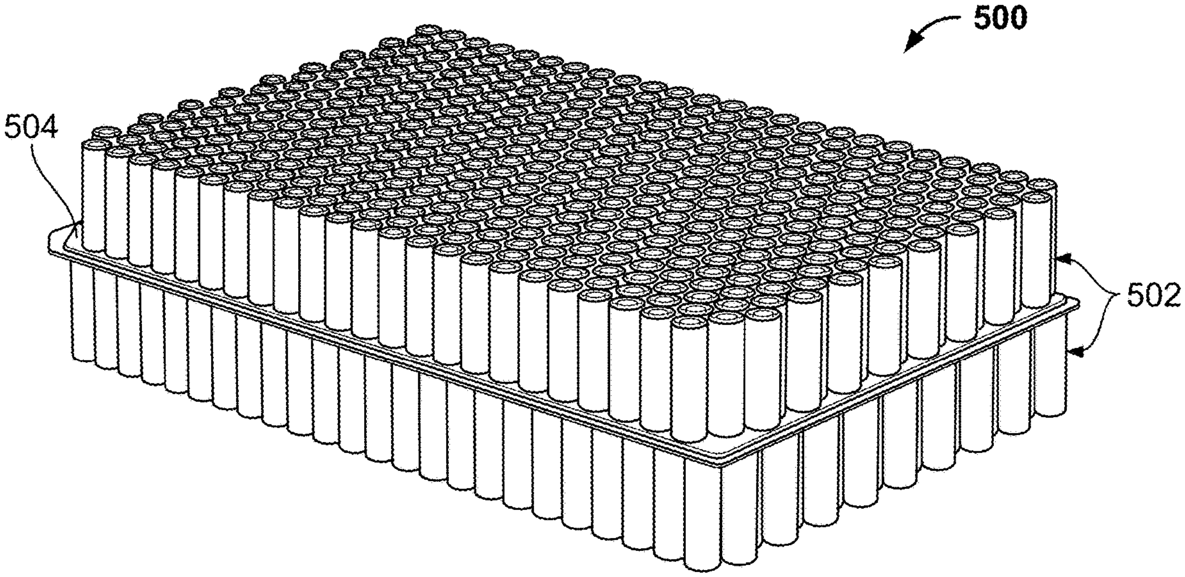
FIG. 5 is a perspective view of an illustrative battery module illustrating first and second groups of cylindrical battery cells coupled to opposite cooling surfaces of a cooling plate, in accordance with some embodiments of the present disclosure.
Figure 6:
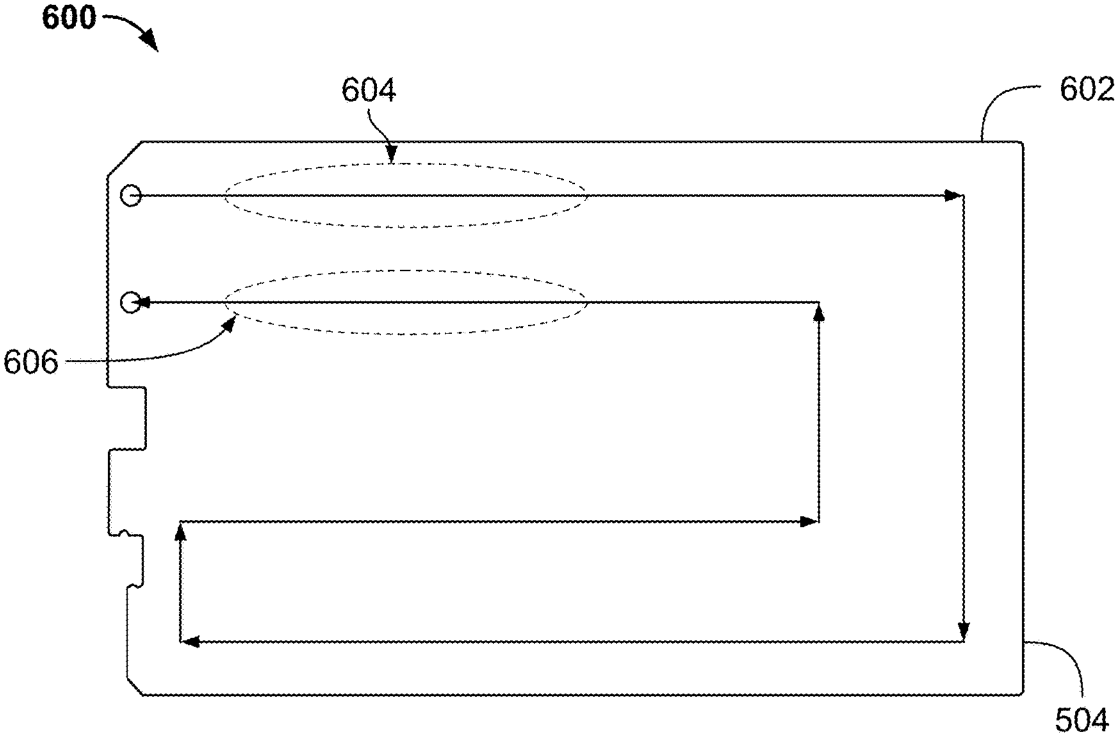
FIG. 6 is a plan view of the cooling plate of FIG. 5, in accordance with some embodiments of the present disclosure.

In some embodiments, the metal phosphate coating materials may be selectively applied on the cathodes of specific LIBs within a battery module where hotspots exist. For example, FIG. 5 is a perspective view of a battery module 500 illustrating first and second groups of cylindrical LIBs 502 coupled to opposite cooling surfaces of a cooling plate 504 in accordance with some embodiments of the present disclosure. The ends of cylindrical LIBs 502 are coupled to the cooling plate 504 so that the cooling plate 504 cools the LIBs. As such, the heat generated in each LIB 502 is drawn toward the cold plate 504 which serves as a heat sink. A suitable thermal interface material (TIM) may be used to join the LIBs 502 to the cooling plate 504 and facilitate the transfer of heat from each LIB to the cooling plate during heat generation. The cooling plate 504 receives or draws this heat through the surfaces of cooling plate 504. FIG. 6 shows a plan view of the cooling plate 504 of FIG. 5. Coolant is passed through cooling plate 504 to remove heat from the cooling plate 504. The coolant flows through coolant channels within cooling plate 504 and generally follows path 602. As the coolant flows along path 602, it absorbs heat and its temperature rises. While path 602 is shown as having a counterflow arrangement to more uniformly dissipate heat and thus reduce temperature gradients across the surface areas connected to the LIBs, hotspots may still exist within the groups of LIBs. For example, a LIB positioned on region 604, which is at the beginning of flow path 602, may cool at a faster rate than a LIB positioned on region 606, which is at the end of flow path 602 where the coolant temperature is higher. Accordingly, region 606 may correspond to a hotspot. The metal phosphate coating materials may be selectively applied to LIBs based on where they are positioned on cold plate 504. For example, the metal phosphate coating materials may be applied on the cathodes of LIBs in region 606 and omitted on the cathodes of LIBs in region 604.

Figure 7:
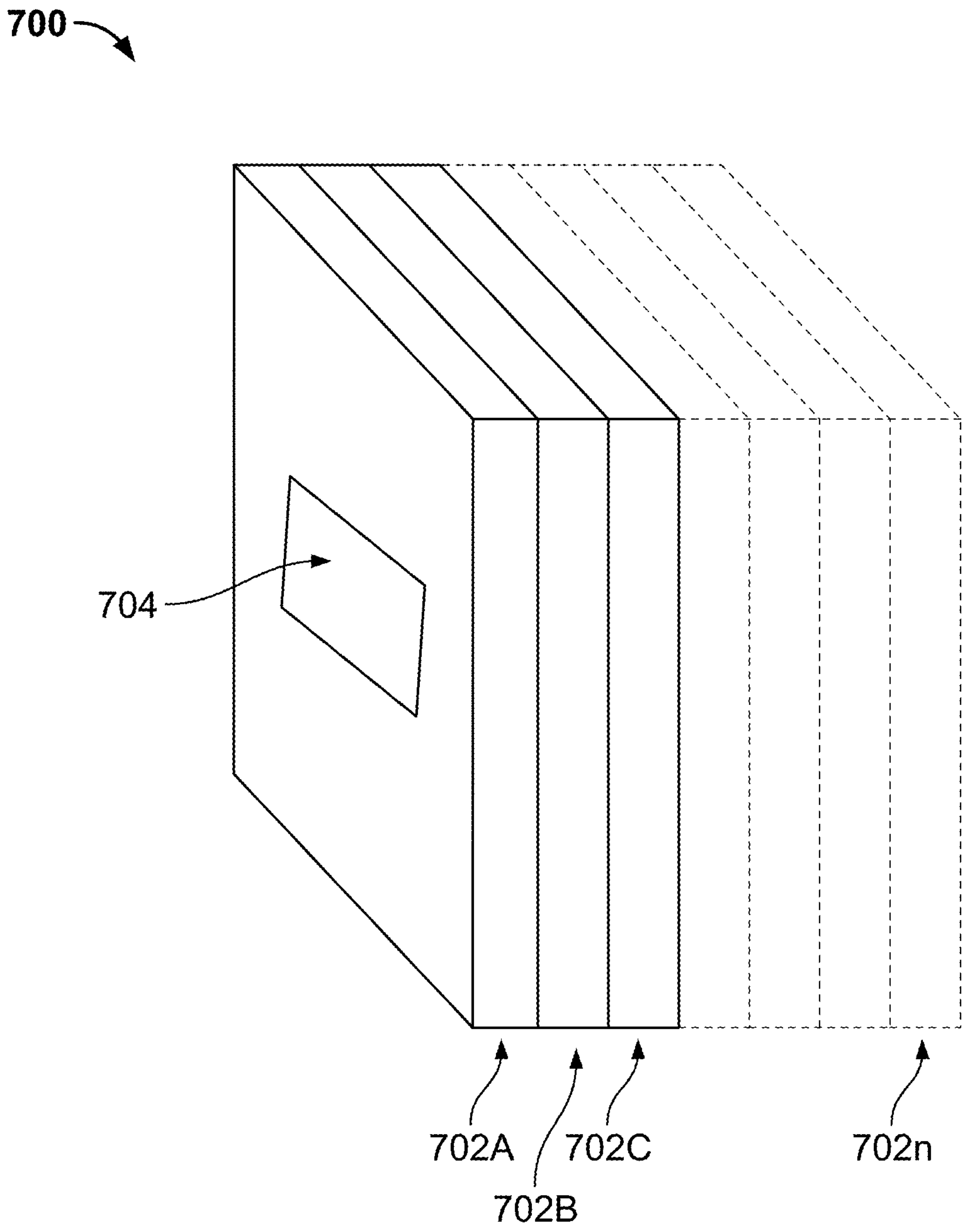
FIG. 7 is a perspective view of a battery module comprising multiple rectangular LIBs, in accordance with some embodiments of the present disclosure.

FIG. 7 is an illustrative example of a battery module 700 comprising rectangular LIBs 702A, B, C, . . . , n (collectively referred to as LIBs 702). In some embodiments, the metal phosphate coating materials may be selectively coated onto one or more cathodes of LIBs 702 in battery module 700. For example, the cathode of LIB 702B which is flanked by two other batteries, may experience greater temperature swings and thus may accumulate more stress than the cathodes of the adjacent LIBs 702A and 702C, because the faces of the battery 702B are not exposed to the surrounding environment. Thus, the location of LIB 702B is another example of a hotspot and the cathode of battery 702B may be coated to prevent degradation resulting from the accumulated stress. In some embodiments, the metal phosphate coating materials may be selectively coated on a partial or the entire surface of the cathodes of a LIB in a battery module or battery pack. Region 704 of LIB 702A, which corresponds to a middle portion of the battery face, is yet another example of a hotspot. As LIB 702A charges and discharges, the middle portion 704 of the face may experience greater temperature swings and thus accumulate greater stress than the surrounding portions that can dissipate heat through the sides of the battery. Accordingly, the cathode of LIB 702A may be partially coated with a metal phosphate coating material only over region 704 to prevent degradation. The surface of the cathode surrounding region 704 may or may not be coated with the same metal phosphate coating material.

Figure 8:
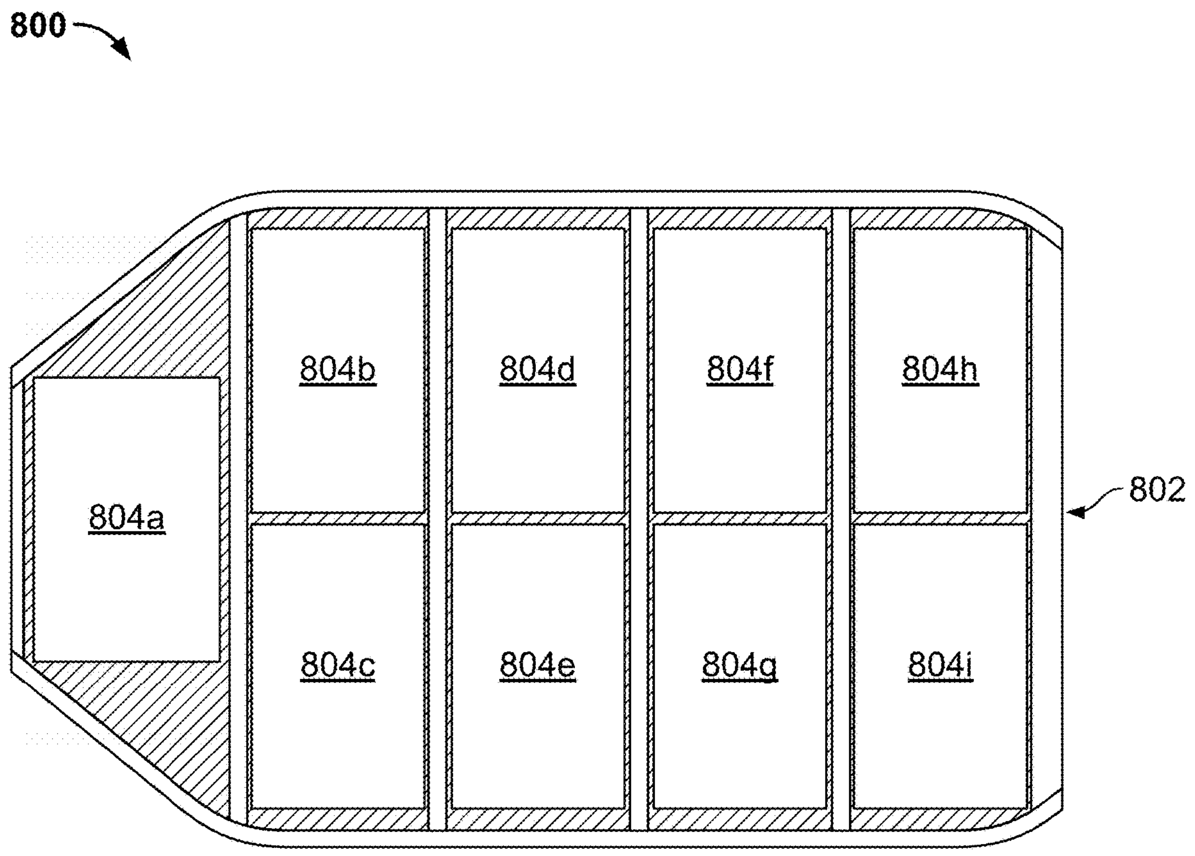
FIG. 8 illustrates a top view of an illustrative battery pack or assembly comprising a plurality of battery modules, in accordance with some embodiments of the present disclosure.

In some embodiments, the metal phosphate coating materials may be selectively applied on the cathodes of specific LIBs within a battery pack. FIG. 8 illustrates a top view of a battery pack or assembly 800 that comprises a plurality of battery modules 804*a-i* (collectively referred to as battery modules 804). The battery pack 800 may include wall assembly 802. Wall assembly 802 forms a part of a housing that encloses the battery modules 804. Each of the modules 804 may include one or more, and in some cases many, battery cells. Battery modules 804 may be comprised of a plurality of battery cells that are interconnected to generate an amount of electrical energy to be provided to a larger vehicle system. For example, in some embodiments, each battery module 804 corresponds to battery module 700 of FIG. 7. Battery modules 804 may be arranged vertically, horizontally, or may be stacked over each other. Battery modules 804 may be separated by dividing walls which may create channels for heat generated by battery modules 804. In some situations, this may cause hotspots to be generated in the inner central battery modules of battery pack 800 (e.g., battery modules 804*d-g*) compared to the surrounding battery modules (e.g., battery modules 804*a-c, h*, and *i*). Accordingly, in some embodiments, the LIBs of battery modules 804*d-g* may be coated with a metal phosphate coating material of the present disclosure to prevent degradation of the cathodes. The metal phosphate coating may be omitted in the other ones of battery modules 804 or selectively applied to local hotspots within the battery modules as described above.

In some embodiments, a lithium ion battery pack, comprises (1) a first plurality of lithium ion battery cells, each comprising a cathode having a first type of metal phosphate coatings of the present disclosure; (2) a second plurality of lithium ion battery cells, each comprising a cathode having a second type of metal phosphate coating different than the first type of metal phosphate coating. The first and second plurality of lithium ion battery cells are electrically coupled together to form the lithium ion battery pack and are positioned within the lithium ion battery pack at one or more hotspots as described above. The lithium ion battery pack may also comprise a plurality of battery modules, wherein a first one of the battery modules comprises only lithium ion battery cells of the second plurality of lithium ion battery cells and a second one of the battery modules comprises lithium ion battery cells of the first plurality of lithium ion battery cells.

Definitions

"Anode" refers to an electrode in a LIB where oxidation occurs during discharge of the electrochemical cell. An anode is identified in a battery as the negative electrode, where electrons are emitted during discharge for use by a load. An anode oxidizes material and releases positive ions to an electrolyte during discharge.

"Cathode" refers to an electrode in a LIB where reduction occurs during discharge of the battery. A cathode is identified as the positive electrode, where electrons are received during discharge after use by a load. A cathode reduces positive ions received from an electrolyte during discharge. "Cathode material" refers to the overall group of substances that make up the cathode, such as cathode active material as well as other material, which may be inactive.

"Active material" refers to a component of an electrode that takes part in an electrochemical reaction during charging or discharging of an electrochemical cell including the electrode. For example, an electrode may include an active material, a binder, and a conductive additive, the active material corresponds to the component of the electrode that undergoes oxidation or reduction in an electrochemical reaction during charging or discharging. For example, anode active materials may include elemental materials, such as lithium, alloys including Si and Sn, or other lithium compounds, and intercalation host materials, such as graphite. For example, cathode active materials include, but are not limited to, those comprising lithium, lithiated compounds, non-lithiated compounds, and metal phosphates such as $LiMnPO_4$, $LiFePO_4$, $LiCoPO_4$, and $LiNiPO_4$. Other examples of cathode active materials include metal substituted $LiFe_{1-a}(M^{I}M^{II}\ldots)_{a}PO_4$ (where 0<a<1) such as $LiMn_{0.2}Fe_{0.8}PO_4$; $LiMn_{0.33}Fe_{0.33}Co_{0.33}PO_4$, and metal-doped $LiFe_{1-x}M'_{x}PO_4$ (M=Zr, Nb, Cr, Y, Mg, or any other metal from the periodic table, where x is less than 0.1), etc.

"Electrolyte" refers to an ionically conductive material such as solvents, ionic liquids, metal salts, ions such as metal ions or inorganic ions, polymers, ceramics, and other components. An electrolyte may be an organic or inorganic solid or a liquid, such as a solvent (e.g., a non-aqueous solvent) containing dissolved salts. Non-aqueous electrolytes can include organic solvents, such as, cyclic carbonates, linear carbonates, fluorinated carbonates, benzonitrile, acetonitrile, tetrahydrofuran, 2-methyltetrahydrofuran, γ-butyrolactone, dioxolane, 4 methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethyleneglycol, dimethylether, and mixtures thereof. Some examples of salts that may be included in electrolytes include lithium salts, such as $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y-1}SO_2)$, (where x and y are natural numbers), LiF, LiCl, LiI, and mixtures thereof. For example, a liquid electrolyte characterized by a $LiPF_6$ salt dissolved in a carbonate solution may be used. In another example, a solid-state electrolyte, including but not limited to oxide, sulfide, or phosphates-based crystalline structures may replace the liquid electrolyte.

"Separator" refers to an ion conductive barrier used to separate an anode and a cathode in a LIB. A separator is a porous or semi-permeable membrane that restricts the passage of certain materials across the membrane, while allowing other materials, such as ions, to pass through the membrane. A separator provides a physical spacing between the anode and the cathode. A separator is not electrically conductive and provides a gap in electrical conductivity between the anode and the cathode in a LIB.

"Phosphates" refers to compounds of phosphorus and oxygen. Examples of phosphates include, for example, those having $PO_4^{-3}$ groups, perphosphates ($PO_5^{-3}$), those having $PO_3^{-4}$ groups, and those having $P_2O_7^{-4}$ groups.

Figure 9A:
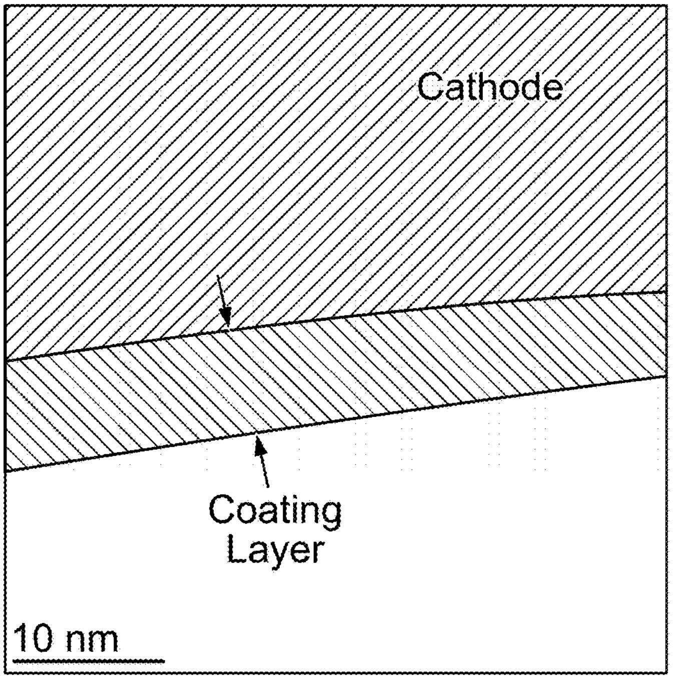
FIG. 9A and FIG. 9B show illustrative cathodes coated with a coating layer, in accordance with some embodiments of the present disclosure.
Figure 9B:
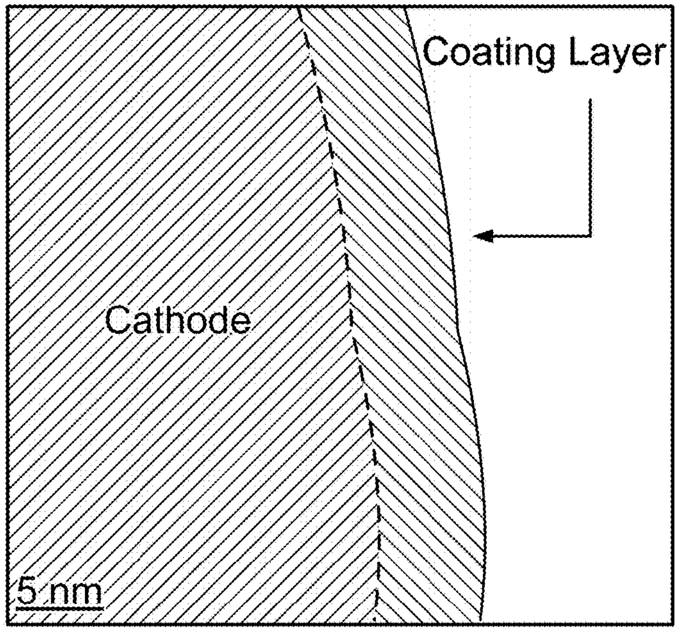

"Coating" may refer to a process of depositing or otherwise providing a layer (or partial layer) of one material over an underlying material. A "coating" or "coating material" may also refer to the layer (or partial layer) of material that is provided over the underlying material. A coating may provide a protective barrier to the underlying material, which may allow, for example, a degree of protection of the underlying material from reacting with other substances above the coating. FIG. 9A and FIG. 9B show exemplary cathodes coated with a coating layer wherein the coating layer has a thickness of 10 and 5 nm, respectively. Coatings may be formed by precipitating material onto a surface of an object in solution, such as a cathode, cathode active material, or suspended particles of a cathode active material. For example, coatings on suspended particles of a cathode active material may be formed by a cation-anion precipitation reaction in a suspension. Coatings may also be formed by depositing material onto a surface of an object, such as by atomic layer deposition or chemical vapor deposition processes. The cathode metal coating materials of this disclosure are designed, for example, to protect the cathode active material from degradation by, e.g., HF, $PF_5^-$, LiF, and LiOH. For example, the coating materials act to scavenge HF, $PF_5^-$ and to be unreactive or inert in the presence of LiF and LiOH. The cathode metal coating materials are also stable against $LiFePO_4$, or any other material used in cathodes.

"Conformal" refers to a relative orientation of materials such that a first material is provided adjacent to a second material and follows the topology and curvature of the surface of the second material such that a thickness of the first material does not substantially deviate from an average thickness at recessed or raised regions of the second material. In some embodiments, the metal phosphate coatings of this disclosure are applied as a conformal layer on the cathode of a LIB.

"Continuous" refers to a coating layer that is uniform, regular, even, and covers the entire underlying surface on which the layer rests. In some embodiments, the metal phosphate coatings of this disclosure are applied as a continuous layer on the cathode of a LIB.

"Discontinuous" refers to a coating layer that is broken, intermittent, irregular, uneven, or the like, so that it does not cover the entire underlying surface on which the layer rests. A continuous and thick coating on the battery cathode can enhance the energy density of a LIB but this may decrease Li ion diffusion. Discontinuous layers can improve Li ion diffusion within the electrolyte in the electrode by providing some lapses or breaks in the coating layer allowing for Li ions to diffuse through the breaks in the coatings. In some embodiments, metal phosphate coatings of this disclosure are applied as a discontinuous layer on the cathode of a LIB.

A "protective barrier" refers to the property of a material, such as a coating, that isolates, prevents, or otherwise reduces the rate at which an undesired reaction or undesired contact takes place with a material underlying the coating. For example, a coating may serve as a protective barrier for an underlying material by preventing the underlying material from making direct contact with materials or substances above the coating, such as a liquid or solution, or from the heat generated in a hotspot of a battery cell, module, or pack. In some embodiments, a metal phosphate coating of this disclosure reduces the rate at which a chemical or electrochemical reaction occurs between an underlying material and materials or substances above the coating and/or may prevent the chemical or electrochemical reaction from occurring at all. In some embodiments, a metal phosphate coating of this disclosure or other coating over a cathode active material provides a protective barrier against oxidative degradation of an electrolyte that contacts the coating and/or the cathode active material. In some embodiments, a metal phosphate coating of this disclosure provides a protective barrier against degradation in a hotspot of a battery cell, module, or pack. In some embodiments, the protective barrier may be formed by partially coating the cathode in a hotspot of the battery cell. In some embodiments, the protective barrier may be formed by coating the entire surface of the cathode in a hotspot of a battery cell, module, or pack.

As used herein "hotspot" refers to a place within a LIB, or within a battery module or pack containing multiple LIBs, where more accumulated stress is being experienced within the battery as compared to other places within the same. As used herein "hotspot" also refers to where degradation occurs at a faster rate due to thermal, electrochemical, or chemical characteristics. FIGS. 4, 5, 6, 7 and 8 show examples of hotspots in LIB cells, modules and packs, respectively, as described above. It will be understood that these are merely examples of hotspots and that hotspots can occur based on the geometry of LIBs and the environment surrounding the LIBs. Other examples of hotspots include: (1) locations in LIBs and battery modules or packs that are far and away from cooling plates; (2) regions experiencing local electrochemical build up, such as high current; (3) where ohmic resistance due to uneven conductivity occurs from the active cathode materials; and (4) where some electrodes have been exposed to air and/or humidity before being incorporated in a battery cell.

As used herein "cell cycle" refers to the number of charge and discharge cycles that a battery can complete before losing performance. The cycle life of a LIB is affected by the depth of discharge which is the amount of a battery's storage capacity that is utilized.

Cathode Coating Materials

As disclosed herein, the metal phosphates of this disclosure when used to coat a cathode active material provide a number of specific advantages to the cathode materials. For example, in some embodiments the metal phosphate coating of this disclosure provides a protective barrier against oxidative degradation of an electrolyte in contact with the composite cathode material. In other embodiments, the metal phosphate coating reduces the rate at which an electrolyte is decomposed and/or the rate at which a surface layer or solid electrolyte interface (SEI) is formed. In other embodiments, the metal phosphate coating of this disclosure extends the cycle life of a LIB to cycles well in excess of the cycle life of comparable batteries that do not include a metal phosphate coating of this disclosure.

In some embodiments, the metal phosphate coating of this disclosure is uniformly distributed over a cathode active material. In some embodiments, the metal phosphate coating of this disclosure partially covers the cathode with a continuous or discontinuous coating. In some embodiments, the metal phosphate coating of this disclosure is conformal to the cathode active material. Use of continuous or conformal metal phosphate coatings may be useful for protecting an electrolyte from oxidative degradation. Use of a discontinuous metal phosphate coating may be useful for improving Li ion diffusion within the electrolyte in the electrode. The process by which the metal phosphate coating is formed may dictate whether the metal phosphate coating is of uniform thickness or is conformal to the underlying cathode active material.

Figure 1:
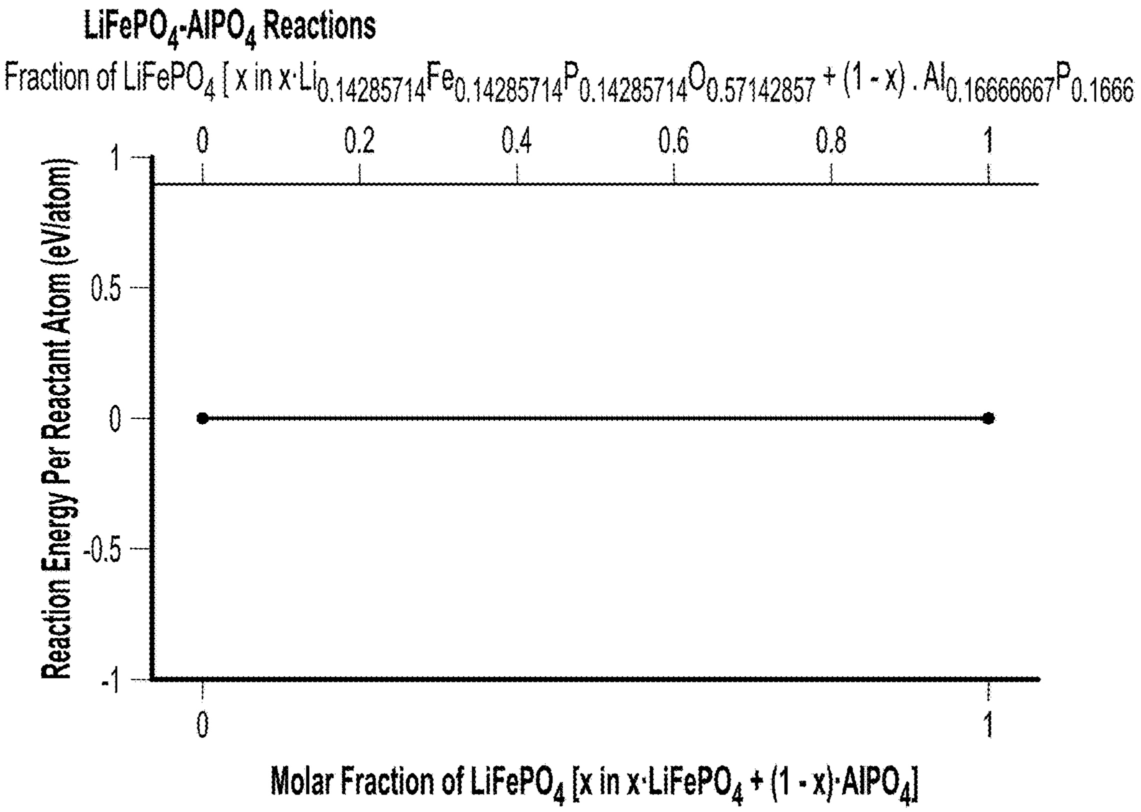
FIG. 1 shows an illustrative example of chemical reaction between $AlPO_4$ and $LiFePO_4$.
Figure 2:
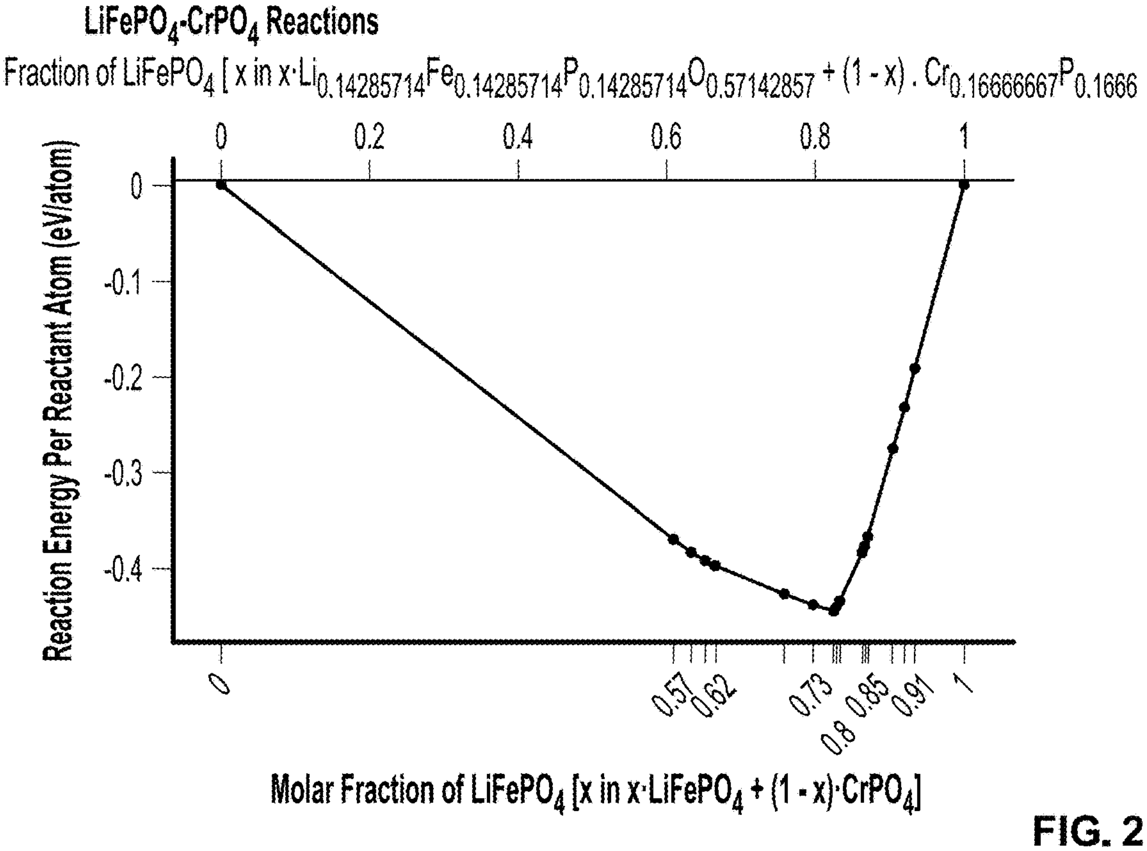
FIG. 2 shows an illustrative example of chemical reaction between $CrPO_4$ and $LiFePO_4$.
Figure 10:
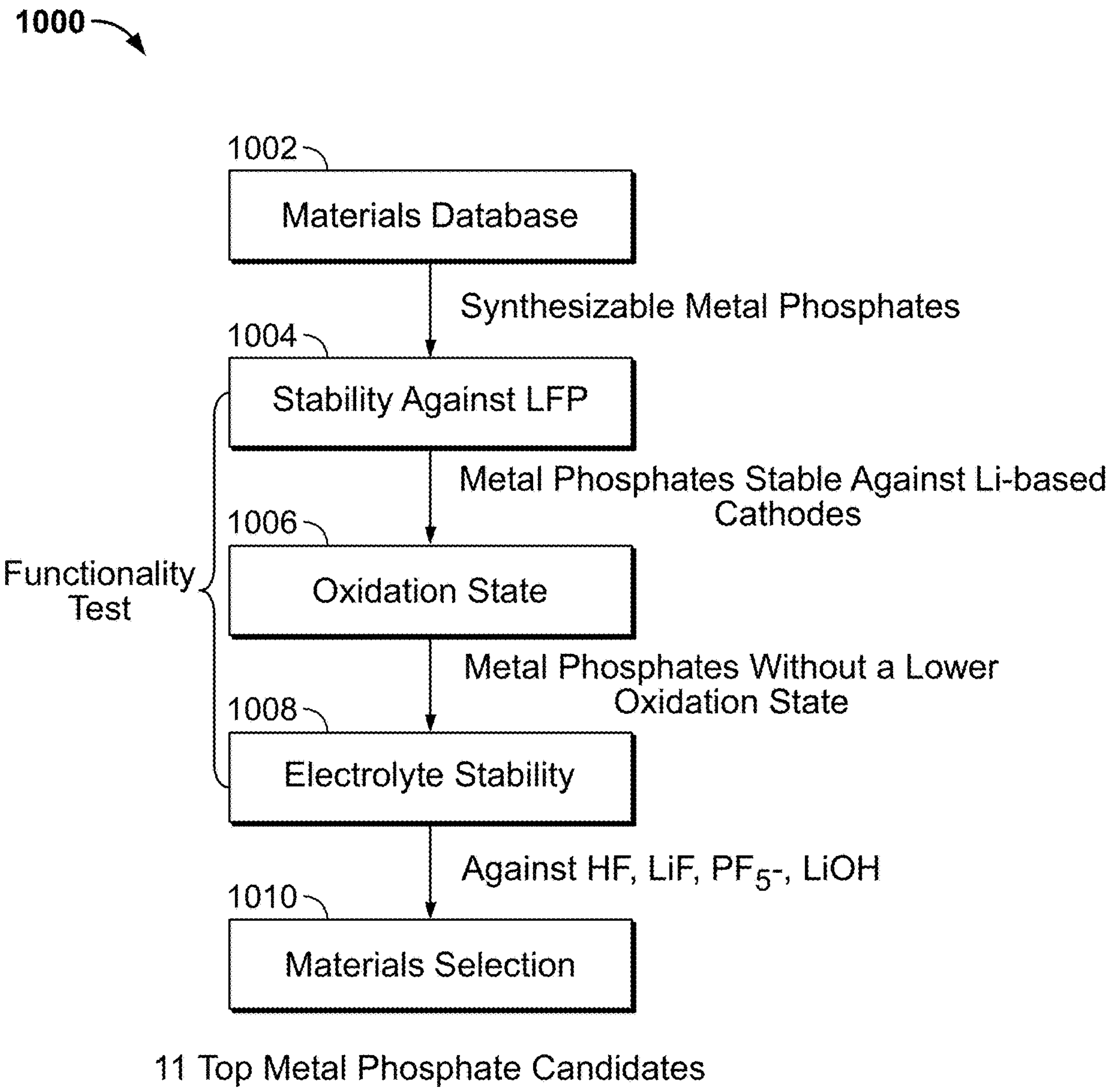
FIG. 10 shows the metal phosphate coating material screening workflow, in accordance with some embodiments of the present disclosure.

Metal phosphates are compounds of formula $M_xP_yO_z$, with x, y, and z being numbers. In some embodiments, the metal phosphates coatings of this disclosure are selected by using a screening process that (1) removes any metal phosphate material that is not stable (i.e., inert, non-reactive) in the presence of $LiFeO_4$, or any other material used in cathodes, wherein M is a metal that is not a noble metal (e.g., Pt, Au, etc.) or a toxic metal (e.g., Pb, As, Cd, etc.), and (2) selects certain metal phosphate coating materials based on their stability in the presence of certain electrolyte components. For example, FIG. 10 shows the screening process 1000 for selecting metal phosphate coating materials. In step 1002, using a publicly available material database such as the Materials Project or Open Quantum Materials Database (OQMD), metal phosphates are screened for their ability to be synthesized. Such a screen may result in hundreds of materials. Next, in step 1004, the metal phosphates of step 1002 are screened for stability against the cathode material, i.e. no reaction between the metal phosphate coating and the cathode material. For example, FIG. 1 and FIG. 2 show exemplary reaction and non-reaction, respectively, between a metal phosphate and a cathode material. Metal phosphates that are deemed reactive in the presence of a cathode material are eliminated from further screening. In FIG. 10, step 1006, the metal phosphates coating materials of step 1004, comprising a metal that may be reduced to a lower oxidation state are eliminated. In the last step 1008, the metal phosphate coating materials of step 1006, are screened for stability against electrolyte elements (HF, LF, $PF_5^-$, and LiOH) and selected in step 1010 as described below.

In accordance with this disclosure, for example, Table 1 shows that the following compounds are nearly stable with $LiFePO_4$ (i.e., reaction enthalpy close to zero: $0>E_{rxn}>-0.005$ eV/atom) and have a low metal oxidation state (an advantage because $LiFeO_4$ cathodes are synthesized in a reducing environment).

TABLE 1

Chemical stability with $LiFePO_4$.

| Compound No. | Metal Phosphate | Chemical Reactions |
|---|---|---|
| 1 | $Ca_2P_2O_7$ | Does not react |
| 2 | $Mn_2P_2O_7$ | $0.941\ LiFePO_4 + 0.059\ Mn_2P_2O_7 \rightarrow 0.059\ Fe_2P_2O_7 + 0.118\ Li_8MnFe_7(PO_4)_8$ |
| 3 | $Mn_3(PO_4)_2$ | $0.96\ LiFePO_4 + 0.04\ Mn_3(PO_4)_2 \rightarrow 0.04\ Fe_3(PO_4)_2 + 0.12\ Li_8MnFe_7(PO_4)_8$ |
| 4 | $Ni_3(PO_4)_2$ | $0.667\ LiFePO_4 + 0.333\ Ni_3(PO_4)_2 \rightarrow 0.333\ Fe_2Ni(PO_4)_2 + 0.667\ LiNiPO_4$ |
| 5 | $YPO_4$ | Does not react |
| 6 | $Sn_5(PO_5)_2$ | Does not react |
| 7 | $Sn_3(PO_4)_2$ | Does not react |
| 8 | $Sn_2P_2O_7$ | $0.571\ LiFePO_4 + 0.429\ Sn_2P_2O_7 \rightarrow 0.286\ Li_2FeP_2O_7 + 0.143\ Fe_2P_2O_7 + 0.286\ Sn_3(PO_4)_2$ |
| 9 | $Hf_2P_2O_9$ | Does not react |
| 10 | $Bi_3PO_7$ | Does not react |
| 11 | $BiPO_4$ | Does not react |

As illustrated above, among the metal phosphates of this disclosure, the following had a reaction enthalpy value close or equal to 0, and thus were deemed to be stable to the $LiFePO_4$ cathode material: $Ca_2P_2O_7$, $YPO_4$, $Sn_5(PO_5)_2$, $Sn_3(PO_4)_2$, $Hf_2P_2O_9$, $BiPO_4$, $Bi_3PO_7$, $Mn_2P_2O_7$, $Mn_3(PO_4)_2$, $Ni_3(PO_4)_2$, and $Sn_2P_2O_7$.

In some embodiments, the metal phosphates of this disclosure are selected based on their reactivity with HF, a very strong acid that can degrade subcomponents in battery cell. The metal phosphates of this disclosure are selected based on their ability to scavenge HF and to prevent decomposition of the cathode material. HF can be found in the electrolyte and is the byproduct of a reaction between residual water/moisture and $LiPF_6$ salt in the battery cell:

$$LiPF_6 + H_2O \longleftrightarrow POF_3 + 2HF + LiF.$$

For example, a $LiFePO_4$ cathode can react with HF in different ratios, leading to the decomposition of the cathode (Table 2).

TABLE 2

$LiFePO_4$ cathode decomposition reactions with HF.

| Molar fraction | Chemical reactions | $E_{rxn}$ [eV/atom] |
|---|---|---|
| 0.000 | $HF \rightarrow HF$ | 0.000 |
| 0.040 | $0.04\ LiFePO_4 + 0.96\ HF \rightarrow 0.04\ LiPF_6 + 0.16\ H_6OF_4 + 0.04\ FeF_2$ | −0.138 |
| 0.059 | $0.059\ LiFePO_4 + 0.941\ HF \rightarrow 0.235\ H_4OF_2 + 0.059\ LiPF_6 + 0.059\ FeF_2$ | −0.149 |
| 0.077 | $0.077\ LiFePO_4 + 0.923\ HF \rightarrow 0.308\ H_3OF + 0.077\ LiPF_6 + 0.077\ FeF_2$ | −0.156 |
| 0.200 | $0.2\ LiFePO_4 + 0.8\ HF \rightarrow 0.2\ LiHF_2 + 0.2\ H_3PO_4 + 0.2\ FeF_2$ | −0.137 |
| 0.333 | $0.333\ LiFePO_4 + 0.667\ HF \rightarrow 0.333\ LiP(HO_2)_2 + 0.333\ FeF_2$ | −0.109 |
| 0.500 | $0.5\ LiFePO_4 + 0.5\ HF \rightarrow 0.25\ LiP(HO_2)_2 + 0.25\ Fe_2PO_4F + 0.25\ LiF$ | −0.074 |
| 1.000 | $LiFePO_4 \rightarrow LiFePO_4$ | 0.000 |

Therefore, it would be beneficial for the metal phosphate coating materials of this disclosure to react with HF to prevent decomposition of the cathode.

The reactivity of metal phosphates with HF is determined by comparison to the reactivity of the standard reaction:

$$0.077AlPO_4+0.923HF \rightarrow 0.308H_3OF+0.077PF_5+0.077AlF_3(E_{rxn}\text{ of }-0.146\text{ eV/atom}).$$

In Table 3, the metal phosphates of this disclosure show improved performance for HF scavenging reactions, when compared with $AlPO_4$. Thus, it is shown that 0.077 $AlPO_4$ reacts with 0.923 HF to form $0.308H_3OF$, 0.077 $PF_5$, and 0.077 $AlF_3$ with $E_{rxn}$ of −0.146 eV/atom. In some embodiments, the metal phosphate coatings of this disclosure were selected as being better scavengers of HF when compared to HF. This means that the “Ratio” of HF to metal phosphate is high. For example, $HF/AlPO_4$ is 0.923:0.77=11.99. In the next column, the metal phosphates materials are normalized vs. $AlPO_4$. For example, $Ca_2P_2O_7$ has a ratio of $HF/Ca_2P_2O_7$ equal to 11.99, which when compared to $AlPO_4$ is 11.99:11.99=1 as shown in the next column (vs. $AlPO_4$). This value is beneficial when is less than 1 (i.e., more reactive against HF). Another criteria used in some embodiments to select the metal phosphates of this disclosure is the reaction enthalpy. For the $AlPO_4$ reaction with HF, $E_{rxn}$=−0.146 eV/atom. The enthalpy of the reaction between metal phosphate materials and HF is compared to the enthalpy of the reaction between HF and $AlPO_4$ in the next column. For example, $Ca_2P_2O_7$ has $E_{rxn}$ value of −0.149 eV/atom; therefore, −0.146/−0.149=0.98 as shown in the next column (vs. $AlPO_4$). Also, it is desirable for this value to be less than 1 (i.e., HF scavenging reaction is more favorable). In the next column, “Sum,” the two values for molar ratio and reaction enthalpy that are referenced to $AlPO_4$ are added. Since these values are evaluated based on the molar fraction, they are converted by dividing by the molecular weight: e.g., 2.00:121.95×1,000=16.40 for $AlPO_4$. Lastly, the HF score, percentage improvement, vs. $AlPO_4$ for all materials is calculated as follows: 16.40:7.79×100=210.5% for $Ca_2P_2O_7$. The following metal phosphates were found to be HF scavengers superior to $AlPO_4$:$Mg_3(PO_4)_2$, $Ca_3(PO_4)_2$, $Ca_2P_2O_7$, $VPO_4$, $YPO_4$, $ZrP_2O_7$, $Sn_5(PO_5)_2$, $Sn_3(PO_4)_2$, $Hf_2P_2O_9$, $HfP_2O_7$, $W_2(PO_4)_3$, $BiPO_4$, $Bi_3PO_7$, $LaPO_4$, $TiP_2O_7$, $Mn_2P_2O_7$, $Mn_3(PO_4)_2$, $Ni_3(PO_4)_2$, and $Sn_2P_2O_7$.

TABLE 3

HF reactions with metal phosphate coating candidates.

| Compound | MW | HF reactions | Ratio | vs. $AlPO_4$ | $E_{rxn}$ (eV/atom) | vs. $AlPO_4$ | Sum | Per weight | HF score |
|---|---|---|---|---|---|---|---|---|---|
| $AlPO_4$ | 121.95 | $0.923\ HF + 0.077\ AlPO_4 \rightarrow 0.308\ H_3OF + 0.077\ PF_5 + 0.077\ AlF_3$ | 11.99 | 1.00 | −0.146 | 1.00 | 2.00 | 16.40 | 100.0% |
| $Ca_2P_2O_7$ | 254.1 | $0.962\ HF + 0.038\ Ca_2P_2O_7 \rightarrow 0.077\ PF_5 + 0.077\ CaH_2F_4 + 0.269\ H_3OF$ | 11.99 | 1.00 | −0.149 | 0.98 | 1.98 | 7.79 | 210.5% |
| $YPO_4$ | 183.88 | $0.077\ YPO_4 + 0.923\ HF \rightarrow 0.308\ H_3OF + 0.077\ PF_5 + 0.077\ YF_3$ | 11.99 | 1.00 | −0.147 | 0.99 | 1.99 | 10.84 | 151.3% |
| $Sn_5(PO_5)_2$ | 815.49 | $0.923\ HF + 0.077\ Sn_5(PO_5)_2 \rightarrow 0.154\ H_3PO_4 + 0.154\ H_3OF + 0.385\ SnF_2$ | 11.99 | 1.00 | −0.167 | 0.87 | 1.87 | 2.30 | 713.6% |
| $Sn_3(PO_4)_2$ | 546.07 | $0.96\ HF + 0.04\ Sn_3(PO_4)_2 \rightarrow 0.32\ H_3OF + 0.12\ SnF_2 + 0.08\ PF_5$ | 24.00 | 0.50 | −0.139 | 1.05 | 1.55 | 2.84 | 577.9% |
| $Hf_2P_2O_9$ | 562.92 | $0.964\ HF + 0.036\ Hf_2P_2O_9 \rightarrow 0.321\ H_3OF + 0.071\ PF_5 + 0.071\ HfF_4$ | 26.78 | 0.45 | −0.147 | 0.99 | 1.44 | 2.56 | 640.7% |
| $BiPO_4$ | 303.95 | $0.923\ HF + 0.077\ BiPO_4 \rightarrow 0.308\ H_3OF + 0.077\ BiF_3 + 0.077\ PF_5$ | 11.99 | 1.00 | −0.142 | 1.03 | 2.03 | 6.67 | 245.8% |
| $Bi_3PO_7$ | 769.91 | $0.9\ HF + 0.1\ Bi_3PO_7 \rightarrow 0.3\ H_2O + 0.3\ BiF_3 + 0.1\ H_3PO_4$ | 9.00 | 1.33 | −0.225 | 0.65 | 1.98 | 2.57 | 637.5% |
| $Mn_2P_2O_7$ | 283.82 | $0.955\ HF + 0.045\ Mn_2P_2O_7 \rightarrow 0.318\ H_3OF + 0.091\ PF_5 + 0.091\ MnF_2$ | 21.22 | 0.56 | −0.134 | 1.09 | 1.65 | 5.83 | 281.4% |
| $Mn_3(PO_4)_2$ | 354.76 | $0.96\ HF + 0.04\ Mn_3(PO_4)_2 \rightarrow 0.32\ H_3OF + 0.08\ PF_5 + 0.12\ MnF_2$ | 24.00 | 0.50 | −0.145 | 1.01 | 1.51 | 4.25 | 386.2% |
| $Ni_3(PO_4)_2$ | 354.76 | $0.04\ Ni_3(PO_4)_2 + 0.96\ HF \rightarrow 0.32\ H_3OF + 0.08\ PF_5 + 0.12\ NiF_2$ | 24.00 | 0.50 | −0.142 | 1.03 | 1.53 | 4.31 | 380.9% |
| $Sn_2P_2O_7$ | 411.36 | $0.955\ HF + 0.045\ Sn_2P_2O_7 \rightarrow 0.318\ H_3OF + 0.091\ SnF_2 + 0.091\ PF_5$ | 21.22 | 0.56 | −0.133 | 1.10 | 1.66 | 4.04 | 405.8% |

In some embodiments, the metal phosphates of this disclosure are selected based on their reactivity in the presence of LiF. Electrolyte decomposition leads to the formation of solid electrolyte interface (SEI), which is mainly composed of LiF, $Li_2O$, $Li_2CO_3$ and other insoluble products. Enriching the SEI with LiF improves Li cyclability. Thus, in this embodiment, the metal phosphates coating materials are selected to be unreactive with LiF. The reactivity of metal phosphates with LiF is compared to the reactivity of $AlPO_4$ with LiF which is shown in the reaction below:

$$0.143AlPO_4 + 0.857LiF \rightarrow 0.143Li_3AlF_6 + 0.143Li_3PO_4 \quad (E_{rxn} \text{ of } -0.008 \text{ eV/atom}).$$

For LiF reaction, it is desired that the "Ratio" value is less (i.e., metal phosphate consumes less LiF). Similarly, it is desired for $E_{rxn}$ of the reaction with LiF to be higher (i.e., less favorable to react with LiF). The LiF reactivity of the selected metal phosphates is determined as shown above (HF reactivity calculations) and the results are shown Table 4.

TABLE 4

LiF reactions with metal phosphate coating candidates.

| Compound | LiF Reactions | Ratio | vs. $AlPO_4$ | $E_{rxn}$ (eV/atom) | vs. $AlPO_4$ | Sum | Per weight | LiF score |
|---|---|---|---|---|---|---|---|---|
| $AlPO_4$ | $0.143\ AlPO_4 + 0.857\ LiF \rightarrow 0.143\ Li_3AlF_6 + 0.143\ Li_3PO_4$ | 5.99 | 1.00 | −0.008 | 1.00 | 2.00 | 16.40 | 100.0% |
| $Ca_2P_2O_7$ | $0.8\ LiF + 0.2\ Ca_2P_2O_7 \rightarrow 0.2\ Li_4P_2O_7 + 0.4\ CaF_2$ | 4.00 | 0.67 | −0.018 | 2.25 | 2.92 | 11.48 | 142.8% |
| $YPO_4$ | $0.2\ YPO_4 + 0.8\ LiF \rightarrow 0.2\ LiYF_4 + 0.2\ Li_3PO_4$ | 4.00 | 0.67 | −0.002 | 0.25 | 0.92 | 4.99 | 328.7% |
| $Sn_5(PO_5)_2$ | Does not react with LiF | 0.00 | 0.00 | 0.000 | 0.00 | 0.00 | 0.00 | Stable |
| $Sn_3(PO_4)_2$ | Does not react with LiF | 0.00 | 0.00 | 0.000 | 0.00 | 0.00 | 0.00 | Stable |
| $Hf_2P_2O_9$ | Does not react with LiF | 0.00 | 0.00 | 0.000 | 0.00 | 0.00 | 0.00 | Stable |
| $BiPO_4$ | Does not react with LiF | 0.00 | 0.00 | 0.000 | 0.00 | 0.00 | 0.00 | Stable |
| $Bi_3PO_7$ | $0.25\ Bi_3PO_7 + 0.75\ LiF \rightarrow 0.75\ BiOF + 0.25\ Li_3PO_4$ | 3.00 | 0.50 | −0.005 | 0.63 | 1.13 | 1.46 | 1121.8% |

TABLE 4-continued

LiF reactions with metal phosphate coating candidates.

| Compound | LiF Reactions | Ratio | vs. $AlPO_4$ | $E_{rxn}$ (eV/atom) | vs. $AlPO_4$ | Sum | Per weight | LiF score |
|---|---|---|---|---|---|---|---|---|
| $Mn_2P_2O_7$ | 0.5 $Mn_2P_2O_7$ + 0.5 LiF → 0.5 $Mn_2PO_4F$ + 0.5 $LiPO_3$ | 1.00 | 0.17 | −0.003 | 0.38 | 0.54 | 1.91 | 859.0% |
| $Mn_3(PO_4)_2$ | 0.5 $Mn_3(PO_4)_2$ + 0.5 LiF → 0.5 $LiMnPO_4$ + 0.5 $Mn_2PO_4F$ | 1.00 | 0.17 | −0.015 | 1.88 | 2.04 | 5.76 | 284.9% |
| $Ni_3(PO_4)_2$ | 0.2 $Ni_3(PO_4)_2$ + 0.8 LiF → 0.2 $Li_2NiF_4$ + 0.4 $LiNiPO_4$ | 4.00 | 0.67 | −0.001 | 0.13 | 0.79 | 2.23 | 734.2% |
| $Sn_2P_2O_7$ | Does not react with LiF | 0.00 | 0.00 | 0 | 0.00 | 0.00 | 0.00 | Stable |

In some embodiments, the metal phosphates of this disclosure were further evaluated for reactivity with $PF_5^-$, which is a species that results from the decomposition of the $LiPF_6$ salt via the following reaction:

$$LiPF_6 \longleftrightarrow LiF + PF_5^-.$$

As shown in Table 5 below, $LiFePO_4$ undergoes decomposition in the presence of $PF_5^-$.

TABLE 5

$LiFePO_4$ cathode decomposition reactions with $PF_5^-$.

| Molar Fraction | $PF_5^-$ reactions | $E_{rxn}$ [eV/atom] |
|---|---|---|
| 0.000 | $PF_5$ → $PF_5$ | 0.000 |
| 0.429 | 0.429 $LiFePO_4$ + 0.571 $PF_5$ → 0.286 $Fe(PO_3)_2$ + 0.143 $FeF_2$ + 0.429 $LiPF_6$ | −0.067 |
| 0.750 | 0.75 $LiFePO_4$ + 0.25 $PF_5$ → 0.5 $Fe(PO_3)_2$ + 0.25 $FeF_2$ + 0.75 LiF | −0.061 |

TABLE 5-continued $LiFePO_4$ cathode decomposition reactions with $PF_5^-$.

| Molar Fraction | $PF_5^-$ reactions | $E_{rxn}$ [eV/atom] |
|---|---|---|
| 0.800 | 0.8 $LiFePO_4$ + 0.2 $PF_5$ → 0.4 $Fe(PO_3)_2$ + 0.2 $Fe_2PO_4F$ + 0.8 LiF | −0.052 |
| 0.857 | 0.857 $LiFePO_4$ + 0.143 $PF_5$ → 0.429 $Fe_2PO_4F$ + 0.571 $LiPO_3$ + 0.286 LiF | −0.041 |
| 0.909 | 0.909 $LiFePO_4$ + 0.091 $PF_5$ → 0.273 $Fe_2PO_4F$ + 0.364 $Li_2FeP_2O_7$ + 0.182 LiF | −0.028 |
| 1.000 | $LiFePO_4$ → $LiFePO_4$ | 0.000 |

$PF_5^-$ will decompose $LiFePO_4$ and thus the metal phosphate coating materials in some embodiments of this disclosure are designed to scavenge $PF_5^-$ ions and prevent degradation. Thus, the metal coating materials are designed to react with $PF_5^-$, thereby preventing degradation of the cathode. Table 6 shows that the metal phosphates of this disclosure were found to be favorably reactive with $PF_5^-$: $Ca_2P_2O_7$, $YPO_4$, $Sn_5(PO_5)_2$, $Sn_3(PO_4)_2$, $Hf_2P_2O_9$, $BiPO_4$, $Bi_3PO_7$, $Mn_2P_2O_7$, $Mn_3(PO_4)_2$, $Ni_3(PO_4)_2$, and $Sn_2P_2O_7$.

TABLE 6

$PF_5^-$ reactions with metal phosphates candidates.

| Compound | $PF_5^-$ Reactions | Ratio | vs. $AlPO_4$ | $E_{rxn}$ (eV/atom) | vs. $AlPO_4$ | Sum | Per weight | $PF_5^-$ Score |
|---|---|---|---|---|---|---|---|---|
| $AlPO_4$ | 0.25 $PF_5$ + 0.75 $AlPO_4$ → 0.333 $Al(PO_3)_3$ + 0.417 $AlF_3$ | 0.33 | 1.00 | −0.056 | 1.00 | 2.00 | 16.40 | 100.00% |
| $Ca_2P_2O_7$ | 0.353 $PF_5$ + 0.647 $Ca_2P_2O_7$ → 0.412 $CaP_4O_{11}$ + 0.882 $CaF_2$ | 0.55 | 0.61 | −0.052 | 1.08 | 1.69 | 6.64 | 246.89% |
| $YPO_4$ | 0.75 $YPO_4$ + 0.25 $PF_5$ → 0.333 $Y(PO_3)_3$ + 0.417 $YF_3$ | 0.33 | 1.00 | −0.064 | 0.88 | 1.88 | 10.20 | 160.84% |
| $Sn_5(PO_5)_2$ | 0.571 $PF_5$ + 0.429 $Sn_5(PO_5)_2$ → 1.429 $SnPO_3F$ + 0.714 $SnF_2$ | 1.33 | 0.25 | −0.122 | 0.46 | 0.71 | 0.87 | 1885.13% |
| $Sn_3(PO_4)_2$ | 0.4 $PF_5$ + 0.6 $Sn_3(PO_4)_2$ → 1.6 $SnPO_3F$ + 0.2 $SnF_2$ | 0.67 | 0.50 | −0.063 | 0.89 | 1.39 | 2.54 | 644.81% |
| $Hf_2P_2O_9$ | 0.364 $PF_5$ + 0.636 $Hf_2P_2O_9$ → 0.818 $HfP_2O_7$ + 0.455 $HfF_4$ | 0.57 | 0.58 | −0.088 | 0.64 | 1.22 | 2.17 | 757.48% |
| $BiPO_4$ | 0.25 $PF_5$ + 0.75 $BiPO_4$ → 0.333 $Bi(PO_3)_3$ + 0.417 $BiF_3$ | 0.33 | 1.00 | −0.029 | 1.93 | 2.93 | 9.64 | 170.07% |
| $Bi_3PO_7$ | 0.429 $PF_5$ + 0.571 $Bi_3PO_7$ → $BiPO_4$ + 0.714 $BiF_3$ | 0.75 | 0.44 | −0.205 | 0.27 | 0.72 | 0.93 | 1761.44% |
| $LaPO_4$ | 0.75 $LaPO_4$ + 0.25 $PF_5$ → 0.333 $La(PO_3)_3$ + 0.417 $LaF_3$ | 0.33 | 1.00 | −0.065 | 0.86 | 1.86 | 7.96 | 206.05% |
| $Mn_2P_2O_7$ | 0.25 $PF_5$ + 0.75 $Mn_2P_2O_7$ → 0.625 $MnF_2$ + 0.875 $Mn(PO_3)_2$ | 0.33 | 1.00 | −0.033 | 1.70 | 2.70 | 9.50 | 172.59% |

TABLE 6-continued

| PF$_5^-$ reactions with metal phosphates candidates. | | | | | | | | |
|---|---|---|---|---|---|---|---|---|
| Compound | PF$_5^-$ Reactions | Ratio | vs. $AlPO_4$ | $E_{rxn}$ (eV/atom) | vs. $AlPO_4$ | Sum | Per weight | PF$_5^-$ Score |
| $Mn_3(PO_4)_2$ | 0.4 $PF_5$ + 0.6 $Mn_3(PO_4)_2$ → $MnF_2$ + 0.8 $Mn(PO_3)_2$ | 0.67 | 0.50 | −0.07 | 0.80 | 1.30 | 3.66 | 447.55% |
| $Ni_3(PO_4)_2$ | 0.4 $PF_5$ + 0.6 $Ni_3(PO_4)_2$ → 0.8 $Ni(PO_3)_2$ + $NiF_2$ | 0.67 | 0.50 | −0.06 | 0.93 | 1.43 | 4.04 | 405.92% |
| $Sn_2P_2O_7$ | 0.273 $PF_5$ + 0.727 $Sn_2P_2O_7$ → 0.091 $SnP_4O_{11}$ + 1.364 $SnPO_3F$ | 0.38 | 0.89 | −0.06 | 0.93 | 1.82 | 4.43 | 370.48% |

In some embodiments, the metal phosphates of this disclosure were tested for reactivity in the presence of LiOH. LiOH may also be present at the surface of cathode materials, depending on the choice of Li salt precursors in the electrolytes. LiOH may react with the cathode material, for example $LiFe_4$, which leads to formation of $H_2O$, and then can subsequently form HF. For example, $LiFePO_4$ reacts with LiOH according to following reaction:

$$0.333LiFePO_4+0.667LiOH \rightarrow 0.333Fe+0.333Li_3PO_4+0.333H_2O(E=-0.054\ eV/atom).$$

The metal phosphate coating materials of this disclosure are tested for reactivity in the presence of LiOH. It is desirable that a LiOH reaction with the metal phosphate coating not to take place, and to avoid the formation of $H_2O$ as a reaction product. Table 7 shows the reactivity of the metal phosphates of this disclosure in the presence of LiOH.

TABLE 7

| LiOH reactions with the metal phosphates. | | | | | | | | |
|---|---|---|---|---|---|---|---|---|
| Compounds | LiOH Reactions | Ratio | vs. $AlPO_4$ | $E_{rxn}$ (eV/atom) | vs. $AlPO_4$ | Sum | Per weight | LiOH Score |
| $AlPO_4$ | 0.25 $AlPO_4$ + 0.75 LiOH → 0.25 $Li_3PO_4$ + 0.25 $AlHO_2$ + 0.25 $H_2O$ | 3.00 | 1.00 | −0.105 | 1.00 | 2.00 | 16.40 | 100.00% |
| $Ca_2P_2O_7$ | 0.706 LiOH + 0.294 $Ca_2P_2O_7$ → 0.118 $Ca_5P_3HO_{13}$ + 0.235 $Li_3PO_4$ + 0.294 $H_2O$ | 2.40 | 0.80 | −0.085 | 0.81 | 1.61 | 6.34 | 258.84% |
| $YPO_4$ | 0.25 $YPO_4$ + 0.75 LiOH → 0.25 $YHO_2$ + 0.25 $Li_3PO_4$ + 0.25 $H_2O$ | 3.00 | 1.00 | −0.048 | 0.46 | 1.46 | 7.92 | 206.96% |
| $Sn_5(PO_5)_2$ | 0.857 LiOH + 0.143 $Sn_5(PO_5)_2$ → 0.714 SnO + 0.286 $Li_3PO_4$ + 0.429 $H_2O$ | 5.99 | 2.00 | −0.088 | 0.84 | 2.84 | 3.48 | 471.62% |
| $Sn_3(PO_4)_2$ | 0.857 LiOH + 0.143 $Sn_3(PO_4)_2$ → 0.429 SnO + 0.286 $Li_3PO_4$ + 0.429 $H_2O$ | 5.99 | 2.00 | −0.103 | 0.98 | 2.98 | 5.45 | 300.66% |
| $Hf_2P_2O_9$ | 0.857 LiOH + 0.143 $Hf_2P_2O_9$ → 0.286 $Li_3PO_4$ + 0.286 $HfO_2$ + 0.429 $H_2O$ | 5.99 | 2.00 | −0.104 | 0.99 | 2.99 | 5.31 | 308.95% |
| $BiPO_4$ | 0.75 LiOH + 0.25 $BiPO_4$ → 0.125 $Bi_2O_3$ + 0.25 $Li_3PO_4$ + 0.375 $H_2O$ | 3.00 | 1.00 | −0.085 | 0.81 | 1.81 | 5.95 | 275.48% |
| $Bi_3PO_7$ | 0.75 LiOH + 0.25 $Bi_3PO_7$ → 0.375 $Bi_2O_3$ + 0.25 $Li_3PO_4$ + 0.375 $H_2O$ | 3.00 | 1.00 | −0.053 | 0.50 | 1.50 | 1.95 | 839.11% |
| $Mn_2P_2O_7$ | 0.857 LiOH + 0.143 $Mn_2P_2O_7$ → 0.286 MnO + 0.286 $Li_3PO_4$ + 0.429 $H_2O$ | 5.99 | 2.00 | −0.096 | 0.91 | 2.91 | 10.26 | 159.85% |
| $Mn_3(PO_4)_2$ | 0.857 LiOH + 0.143 $Mn_3(PO_4)_2$ → 0.429 MnO + 0.286 $Li_3PO_4$ + 0.429 $H_2O$ | 5.99 | 2.00 | −0.066 | 0.63 | 2.63 | 7.40 | 221.54% |
| $Ni_3(PO_4)_2$ | 0.143 $Ni_3(PO_4)_2$ + 0.857 LiOH → 0.429 NiO + 0.286 $Li_3PO_4$ + 0.429 $H_2O$ | 5.99 | 2.00 | −0.101 | 0.96 | 2.96 | 8.34 | 196.59% |
| $Sn_2P_2O_7$ | 0.857 LiOH + 0.143 $Sn_2P_2O_7$ → 0.286 SnO + 0.286 $Li_3PO_4$ + 0.429 $H_2O$ | 5.99 | 2.00 | −0.129 | 1.23 | 3.23 | 7.84 | 209.11% |

As a result, at the end of the screening process shown in FIG. 10, eleven metal phosphates are selected as optimal coating materials. FIG. 11 shows the top four metal phosphates selected as cathode coating materials, with improved stability and reactivity as compared to $AlPO_4$. FIG. 11 shows that $Sn_5(PO_5)_2$ is 7.1 times better at scavenging HF, stable in the presence of LiF, 18.8 times better at scavenging $PF_5^-$ and 4.7 time more stable in the presence of LiOH than $AlPO_4$. $Sn_3(PO_4)_2$ is 5.8 times better at scavenging HF, stable in the presence of LiF, 6.4 times better at scavenging $PF_5^-$ and 3.0 times more stable in the presence of LiOH than $AlPO_4$. $Hf_2P_2O_9$ is 7.0 times better at scavenging HF, stable in the presence of LiF, 7.6 times better at scavenging $PF_5^-$ and 3.1 times more stable in the presence of LiOH than $AlPO_4$. $Bi_3PO_7$ is 6.4 times better at scavenging HF, 11.2 more stable in the presence of LiF, 1.6 times better at scavenging $PF_5^-$ and 8.4 times more stable in the presence of LiOH than $AlPO_4$.

FIGS. 12A-12D show crystal structures of the top four metal phosphates of FIG. 11. FIG. 12A shows the crystal structure of $Sn_5(PO_5)_2$ wherein the black circles represent tin, the white circles represent phosphorous and the gray circles represent oxygen. FIG. 12B shows a crystal structure of $Sn_3(PO_4)_2$ wherein the black circles represent tin, the white circles represent phosphorous and the gray circles represent oxygen. FIG. 12C shows a crystal structure of $Hf_2P_2O_9$ wherein the black circles represent hafnium, the white circles represent phosphorous and the gray circles represent oxygen. FIG. 12D shows a crystal structure of $Bi_3PO_7$ wherein the black circles represent bismuth, the white circles represent phosphorous and the gray circles represent oxygen.

In some embodiments the metal phosphate coating materials of this disclosure are synthesized via various solid-state methods. One method of performing solid-state synthesis is a ball-milling process. In some embodiments the solid-state methods are followed by an optional spray dryer processing step to facilitate the drying and secondary particle formation.

The metal phosphate coating materials of this disclosure are deposited on the cathode active materials. Non-limiting examples of deposition techniques include chemical vapor deposition, physical vapor deposition, pulsed laser deposition, emulsion, sol-gel, atomic layer deposition, and/or other deposition techniques. In some embodiments the optimum amount of metal phosphate on the cathode material surface may be tuned by the secondary heat-treatment conditions and in the presence of reducing gas agents such as $N_2$, Ar, $H_2$, or gas mixture thereof.

The coatings can be formed using sol-gel techniques such as those described in J. Cho et al., Electrochem. Solid-state Lett. 3, 362 (2000); and J. Cho et al., Chem. Mater 12, 3788 (2000). Typically, powders of the synthesized cathode active material (e.g., $LiCoO_2$) are dispersed in an alcohol (e.g., isopropanol, ethanol, etc.) or other suitable solvent in which a metal-containing salt precursor can dissolve. The resulting gel is then dried and heated in a furnace. In another example, the cathode active materials (e.g., $LiMn_2O_4$) can be immersed in a solution containing a cation precursor and an anion precursor, then the gel solution is heated in a furnace to achieve the cathode coating on the cathode active material.

Wet-chemical processes also can be used to form the cathode coatings. An illustrative example of a wet chemical process is described in S. Myung et al., Chem. Mater 17, 3695 (2005) for the formation of an $Al_2O_3$ coating on $Li[Li_{0.05}Ni_{0.4}Co_{0.15}Mn_{0.4}]O_2$ cathode active material particles. In this process, a cation precursor is dissolved in an organic solvent, such as ethanol, at or near room temperature and that solution is slowly added to a solution of the cathode active material. The mixture is then heated with stirring and the resulting coated cathode material is subsequently fired at a high temperature to produce coated particles of the active cathode material.

Other oxide coating techniques can also be employed. Electrostatic spray deposition (EDS), as illustrated in K. Y. Chung et al., *J. Electrochem. Soc.* 152, A791 (2005), 20 and mechanochemical process, as illustrated in S. Kim et al., *J. Electroceram.* 30, 159 (2013); and J.-K. Noh et al, *Sci. Rep.* 4, 4847 (2014). In an EDS process, cathode active materials are treated with metal-containing nitrate compounds, which serve as precursors to the cathode coating material. In a mechanochemical process (also known as a high-energy ball-milling process) a surface coating is applied on powders of a cathode active material, as illustrated in Kim et al. and J.-K. Noh et al., which describe $Li_2MnO_3$ cathode active materials coated with Cr-containing oxides; and $LiNi_{0.5}Mn_{0.3}Co_{0.2}O_2$(NMC) cathode active material powders with the average size of ~10 μm coated with a $Li_2MnO_3$ shell. Other suitable synthetic routes include: co-precipitation route, as described in Y-K. Sun et al., *Nat. Mater* 8, 320 (2009); and Y-K. Sun et al., *Nat. Mater* 11, 942 (2012); atomic layer deposition (ALD), as described in J. Lu et al., *Nat. Commun.* 5, 5693 (2014) and J. Park et al., *Chem. Mater.* 26, 3128 (2014); and thin film deposition, as described in G. Tan et al., *Nat. Commun.* 7, 11774 (2016).

The coatings can be sufficiently thick that the bulk of the coating away from the interface between the cathode active material and the cathode coating material preserves the nominal coating composition. Or the coatings can be sufficiently thin that the coating process allows the reaction of the bulk of the coating material with the cathode. Metal phosphate coating materials of this disclosure may be deposited on the cathode as a layer having the thickness of any of the following values or in a range of any two of the following values: 0.1, 0.2, 0.3, 0.4, 0.5, 0.6, 0.7, 0.8, 0.9, 1, 2, 3, 4, 5, 6, 7, 8, 9, 10, 11, 12, 13, 14, 15 nm. In some embodiments, the thickness of the layer may any of the following values or in a range of any two of the following values: 2, 3, 4, or 5 nm.

The cathodes of this disclosure (i.e., cathodes coated with the metal phosphate coatings of this disclosure) are combined in LIBs with anodes and other common battery materials. The anodes of the LIBs of this disclosure are composed of an active anode material that takes part in an electrochemical reaction during the operation of the battery. In some embodiments, the anode active materials include elemental materials, such as lithium; alloys including alloys of Si and Sn, or other lithium compounds; and intercalation host materials, such as graphite. By way of illustration only, in other embodiments, the anode active material may include a metal and/or a metalloid alloyable with lithium, an alloy thereof, or an oxide thereof. Metals and metalloids that can be alloyed with lithium include Si, Sn, Al, Ge, Pb, Bi, and Sb. For example, in some embodiments, the oxide of the metal/metalloid alloyable with lithium may be lithium titanate, vanadium oxide, lithium vanadium oxide, $SnO_2$, or $SiO_x$ ($0<x<2$).

The cell configuration in the LIB of this disclosure may be prismatic, cylindrical, or pouch type. A cylindrical cell typically consists of sheet-like anodes, separators, and cathodes that are sandwiched, rolled up, and packed into a cylinder-shaped can. Prismatic cells typically consist of large sheets of anodes, cathodes, and separators sandwiched, rolled up, and pressed to fit into a metallic or hard-plastic housing in cubic form. The electrodes can also be assembled by layer stacking rather than jelly rolling. Parts of the electrode and separator sheets of a prismatic cell that are close to the container corners can in some cases experience more stress. Pouch cells, on the other hand, typically do not have a rigid enclosure and use a sealed flexible foil as the cell container. This reduces the weight and leads to flexible cells that can easily fit the available space of a given product. The electrode and separator layers of a pouch cell are typically stacked rather than jelly rolled.

Figure 13:
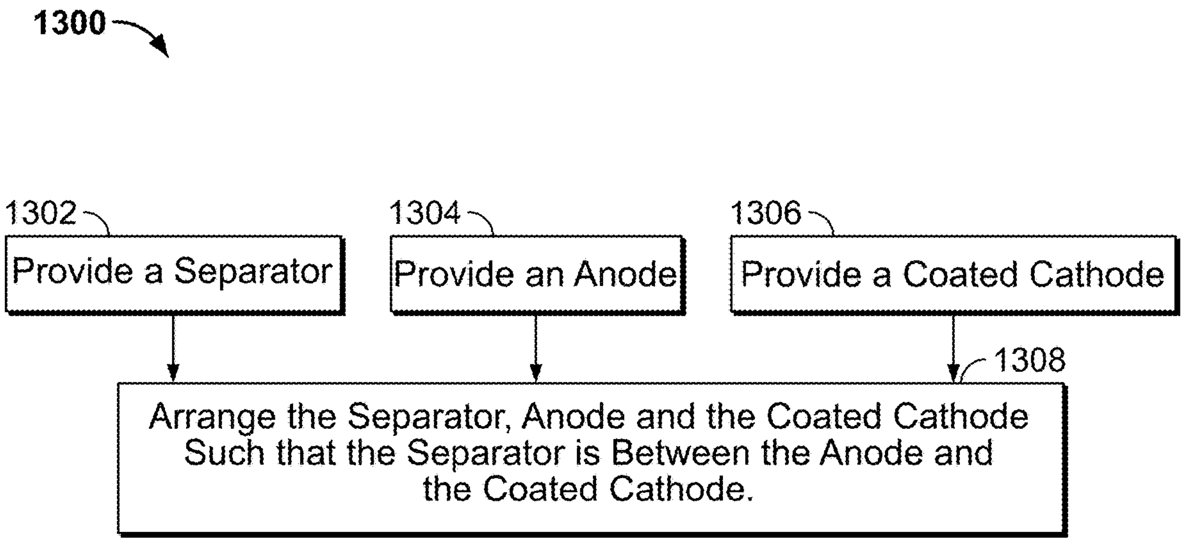
FIG. 13 shows a flowchart of an illustrative process to assemble a LIB, in accordance with some embodiments of the present disclosure.

The present disclosure also includes methods of assembling LIB cells and corresponding battery modules and packs having the coated cathodes as disclosed herein. In some embodiments, the method of assembly includes providing the battery components (e.g., anode, coated cathode, and separator). For example, the components may be provided by manufacturing the components or obtaining them from a supplier. As another example, a component may be provided by retrieving the component from inventory. FIG. 13 shows a flowchart of an illustrative process 1300 to assemble a LIB, in accordance with some embodiments of the present disclosure. Process 1300 may be executed at least in part in a batch or continuous process. At 1302, an anode is provided (e.g., from a storage vessel). At 1304, a coated cathode is provided which is made of a material comprising lithium (Li), a metal (M), and a phosphate group, where M is selected from the group consisting of iron (Fe), manganese (Mn), cobalt (Co), or nickel (Ni). The cathode is coated with any of the metal phosphate coatings described in the present disclosure. The metal phosphate coatings are selected based on specific properties, such as scavenging ability of HF and $PF_5^-$, stability, i.e. no reactivity, against the cathode material as well as LiF and LiOH. The cathode is coated with the metal phosphate using any of the techniques described in the present disclosure. At 1306, a separator is provided (e.g., from a storage vessel). At 1308, the separator, the anode, and the cathode are arranged such that the separator is placed between the anode and the coated cathode (e.g., as illustrated in FIG. 3) to assemble the LIB.

The method of assembly may further include packaging the arranged component in a battery cell housing (e.g., a cylindrical housing, prismatic housing, or a pouch housing). The assembled LIB cell may then be used in a battery module (e.g., battery module 500 of FIG. 5 or 700 of FIG. 7) or pack (e.g., battery pack 800 of FIG. 8). In some embodiments, the assembled LIB cell may be positioned in a hotspot of a battery module or pack (e.g., as LIB 702B or 804*d-g*).

INCORPORATION BY REFERENCE

All documents cited herein, including patents, patent applications, papers, text books, and the like, and the references cited therein, to the extent that they are not already cited herein, are hereby incorporated by reference in their entirety. In the event that one or more of the incorporated documents and similar materials differ from or contradict this application, including but not limited to defined terms, term usage, described techniques, or the like, this application controls.

EXAMPLES

A metal-containing precursor chemical including but not limited to metal nitrates, chloride, sulfate, etc., is dissolved in water or an organic solvent. The solution is mixed with Lithium Ferric Phosphate (LFP) precursors (including carbon coating sources such as sucrose or citric acid) at room temperature or elevated temperature with an aging time varying from 5 min to 24 hours. The pH of the solution is adjusted by the addition of acid or base, in order to precipitate the well-mixed precursor compounds. Then, the mixture is annealed at elevated temperature, e.g. which may be any of the following values or in a range of any two of the following values: 200, 400, 600, 800, and 1,000° C. The aging time may be any of the following values or in a range of any two of the following values: 1, 2, 3, 4, 8, 12, 16, 24, 36, 48, 60 and 72 hours. The materials may include a thin coating layer at the outer surface in a form of island or conformal coatings.

Variously sized metal phosphate containing cathode materials can be also synthesized via a solid-state method. The primary particle size range may any of the following values or in a range of any two of the following values: 30, 40, 50, 60, 70, 80, 90, 100, 110, 120, 130, 140, 150, 160, 170, 180, 190, and 200 nm. In another embodiment, the secondary size range may any of the following values or in a range of any two of the following values: 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, and 20 μm. One method of performing solid-state synthesis is a ball-milling process. The solid-state method may be followed by an optional spray dryer processing step to facilitate the drying and secondary particle formation. The optimal amount of metal phosphate and its chemical composition at the electrode material surface may be tuned by the secondary heat-treatment conditions which may be any of the following values or in a range of any two of the following values: 200, 400, 600, 800, and 1,000° C. in the presence of reducing gas agents such as $N_2$, Ar, $H_2$, or gas mixture thereof.

Metal phosphate coating materials may be deposited on the synthesized electrode active materials, as a post-treatment step. As described above, deposition techniques include chemical vapor deposition, physical vapor deposition, pulsed laser deposition, emulsion, sol-gel, atomic layer deposition, and/or other deposition techniques.

Coating materials containing the metal phosphates of this disclosure are mixed with carbon and binder materials in N-methyl pyrrolidinone (NMP) solution to form a slurry. The slurry is coated on to an Al foil, then dried (typically in the oven) to remove NMP solvent. The cathode will be assembled having a loading level of cathode materials varying from 5 to 30 mg/cm$^2$ and with a varying packing density from 1.0 to 3.0 g/cc.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed compounds and methods but is intended to include variations to and modifications thereof, which are within the spirit of the following claims.

What is claimed:

1. A coated cathode comprising:

a cathode for a lithium ion battery; and a coating material on at least a portion of the cathode, wherein the coating material comprises a metal phosphate selected from the group consisting of $Sn_5(PO_5)_2$, $Bi_3PO_7$, and mixtures thereof.

2. The coated cathode of claim 1, wherein the coating material comprises mixtures of $AlPO_4$ and the metal phosphate selected from the group consisting of $Sn_5(PO_5)_2$, and $Bi_3PO_7$, and mixtures thereof.

3. The coated cathode of claim 1, wherein:

the cathode comprises a material having a formula Li—$(Fe_aNi_bMn_cCo_d)$—$P_xO_y$;

Li is lithium, Fe is iron, Ni is a nickel, Mn is manganese, Co is cobalt, P is phosphorous, O is oxygen;

a, b, c and d are numbers from 0 to 1 and a+b+c+d=1; and x is a number equal to 1 or 2, and y is a number equal to 3, 4, 5, 7, or 9.

4. The coated cathode of claim 3, wherein the a is 1, x is 1 and y is 4, and wherein the material has the formula of $LiFePO_4$.

5. The coated cathode of claim 3, wherein a is 0.8, c is 0.2, x is 1 and y is 4, and wherein the material has the formula of $LiFe_{0.8}Mn_{0.2}PO_4$.

6. The coated cathode of claim 1, wherein the coating material is deposited as a layer on a portion of a surface of the cathode.

7. The coated cathode of claim 1, wherein the coating material is deposited as a layer on an entire surface of the cathode.

8. The coated cathode of claim 6, wherein the layer has a thickness of 0.1 to 15 nm.

9. The coated cathode of claim 6, wherein the layer has a thickness of 2 to 5 nm.

10. The coated cathode of claim 1, wherein the coating material comprises $Bi_3PO_7$.

11. The coated cathode of claim 1, wherein the coating material comprises $Sn_5(PO_5)_2$.

12. The coated cathode of claim 1, wherein the lithium ion battery further comprises:

an anode;

an electrolyte disposed between the anode and the coated cathode; and a separator;

wherein the lithium-ion battery is housed in an electric vehicle.

13. A method of assembling a lithium ion battery, comprising:

providing a separator;

providing an anode;

providing the coated cathode of claim 1; and arranging the separator, anode and the coated cathode such that the separator is between the anode and the coated cathode.

14. A lithium ion battery pack, comprising:

a first plurality of lithium ion battery cells, each comprising a cathode having a first coating material according to claim 1; and a second plurality of lithium ion battery cells, each comprising a cathode having a second coating material different than the first coating material, wherein the first and second plurality of lithium ion battery cells are electrically coupled together to form the lithium ion battery pack.

15. The lithium ion battery pack of claim 14, wherein the first plurality of lithium ion battery cells is positioned within the lithium ion battery pack at one or more hotspots.

16. The lithium ion battery pack of claim 14, wherein the lithium ion battery pack comprises a plurality of battery modules, wherein a first one of the battery modules comprises only lithium ion battery cells of the second plurality of lithium ion battery cells and a second one of the battery modules comprises lithium ion battery cells of the first plurality of lithium ion battery cells.

* * * * *